(12) United States Patent
Nagata et al.

(10) Patent No.: US 12,287,214 B2
(45) Date of Patent: Apr. 29, 2025

(54) INFORMATION PROCESSING DEVICE, INFORMATION PROCESSING METHOD AND INFORMATION PROCESSING SYSTEM

(71) Applicant: TOYOTA JIDOSHA KABUSHIKI KAISHA, Toyota (JP)

(72) Inventors: Yu Nagata, Chofu (JP); Toshihiro Nakamura, Shizuoka-ken (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 155 days.

(21) Appl. No.: 17/713,542

(22) Filed: Apr. 5, 2022

(65) Prior Publication Data

US 2022/0397405 A1 Dec. 15, 2022

(30) Foreign Application Priority Data

Jun. 14, 2021 (JP) .................................. 2021-098570

(51) Int. Cl.
*G01C 21/34* (2006.01)
*G01C 21/00* (2006.01)

(52) U.S. Cl.
CPC ..... *G01C 21/3453* (2013.01); *G01C 21/3889* (2020.08)

(58) Field of Classification Search
CPC ............ G01C 21/3453; G01C 21/3889; G01C 21/3461; G01C 21/3896; H04L 67/34; H04L 67/12; G06F 8/65; H04W 4/40
See application file for complete search history.

(56) References Cited

U.S. PATENT DOCUMENTS

| 2014/0066047 | A1* | 3/2014 | Qiang | H04W 4/70 |
| | | | | 455/419 |
| 2014/0067257 | A1* | 3/2014 | Dave | H04W 4/40 |
| | | | | 701/423 |
| 2016/0183138 | A1 | 6/2016 | Murakami et al. | |
| 2016/0286457 | A1* | 9/2016 | O'Hare | H04L 65/612 |
| 2017/0366835 | A1* | 12/2017 | Chakra | H04W 4/80 |
| 2019/0258467 | A1* | 8/2019 | Frantz | G01C 21/3691 |
| 2019/0383624 | A1* | 12/2019 | Magzimof | H04B 17/373 |
| 2020/0050378 | A1 | 2/2020 | Sakurai et al. | |
| 2020/0371774 | A1 | 11/2020 | Kato et al. | |

FOREIGN PATENT DOCUMENTS

| JP | 2016-119539 A | 6/2016 |
| JP | 2017-228103 A | 12/2017 |
| JP | 2020-27669 A | 2/2020 |
| JP | 2020-190488 A | 11/2020 |

* cited by examiner

*Primary Examiner* — Joan T Goodbody
*Assistant Examiner* — Godfrey Aleksander Maciorowski
(74) *Attorney, Agent, or Firm* — Sughrue Mion, PLLC

(57) ABSTRACT

An information processing device includes a control unit that executes: acquiring a first route based on a communication speed; and creating a first plan for a first vehicle, the first plan being a plan about execution of download of first data during traveling along the first route. The control unit acquires the first route between two predetermined spots, based on a first map indicating a distribution of a communication speed of a first communication carrier that is employed in the first vehicle. The control unit acquires a route for which it is predicted that a time spent on the download of the first data is shortest.

13 Claims, 13 Drawing Sheets

FIG. 2

```
RELEASE NOTE {
{vehicle type:E-palette G0, System Version:V07-01, release date:ddmmyyyy, },
{ECU type: Central ECU, {Program type:PC1, Version:V07-01-1, volume:V1MB, ...},
                       {Program type:PC2, Version:V07-01-3, volume:V2MB, ...},
                       ...
{ECU type: ADS ECU, {Program type:PA1, Version:V07-01-1, volume:V3 MB, ...},
                    {Program type:PA2, Version:V07-01-1, volume:V4 MB, ...},
                    ...
{ECU type: SIS ECU, {Program type:PS1, Version:V07-01-6, volume:V5 MB, ...},
                    {Program type:PS2, Version:V07-01-1, volume:V6 MB, ...},
                    ...
{ECU type: RSE ECU, {Program type:PR1, Version:V07-01-1, volume:V7 MB, ...},
                    {Program type:PR2, Version:V07-01-1, volume:V8 MB, ...},
                    ...
...}
```

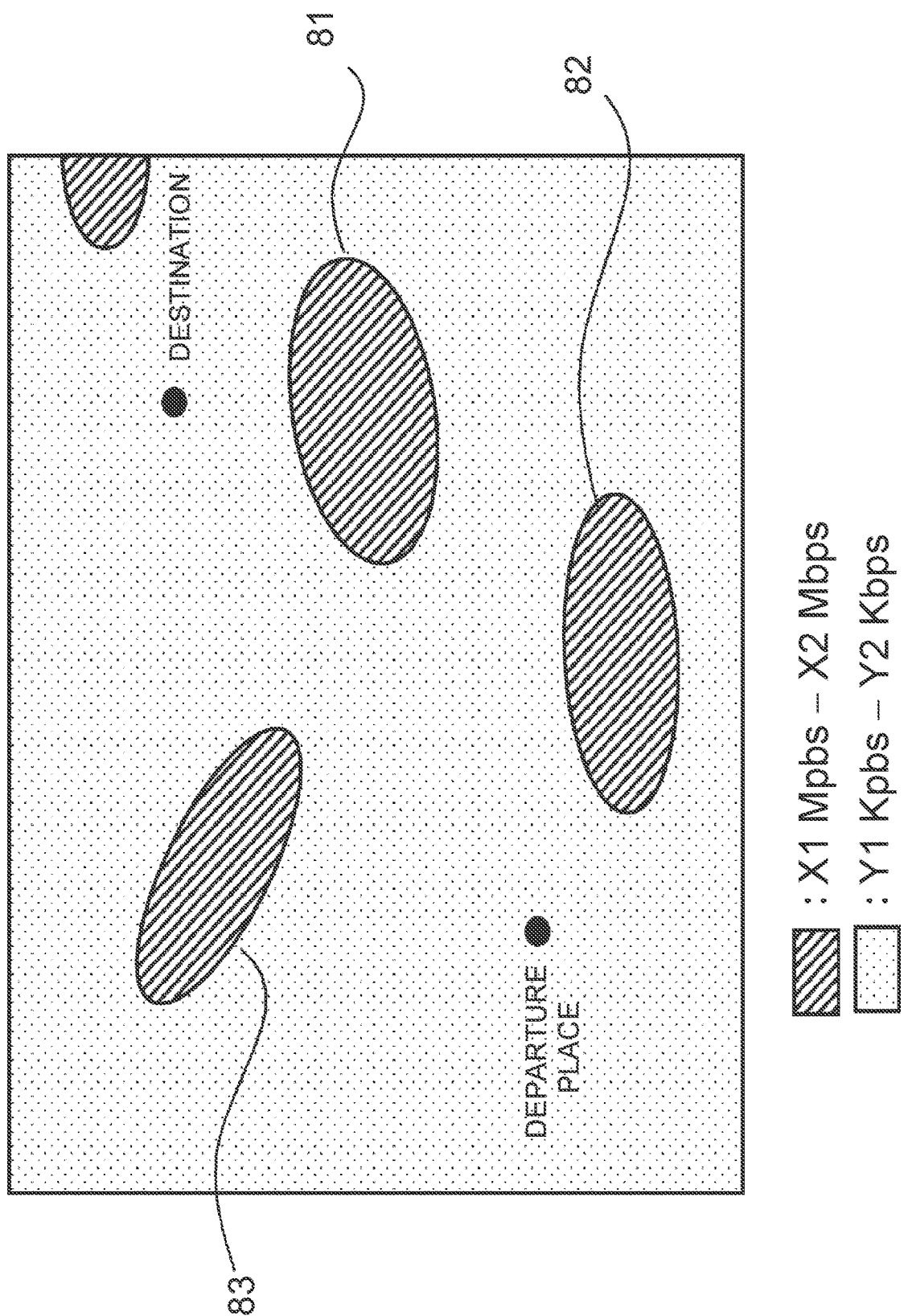

FIG. 6

| VEHICLE ID | E-PALETTE EV1 | | | | | | | | | |
|---|---|---|---|---|---|---|---|---|---|---|
| YEAR-MONTH-DATE | DDMMYYYY | | | | | | | | | |
| HOUR PERIOD | 0:00 | ... | 8:00 | 9:00 | 10:00 | 11:00 | 12:00 | 13:00 | ... | 22:00 | 23:00 |
| ITEM | | ... | | TRAVELING (MOVEMENT, DESTINATION, ROUTE) | TRAVELING (SERVICE, DEPARTURE PLACE, DESTINATION, ROUTE) | TRAVELING (MOVEMENT, DESTINATION, ROUTE), DOWNLOAD (START DATE AND HOUR, AND OTHERS) | UP-DATE | TRAVELING (MOVEMENT, DESTINATION, ROUTE) | ... | TRAVELING (MOVEMENT, DESTINATION, ROUTE) | |

FIG. 7

| VEHICLE ID | E-PALETTE EV1 |
|---|---|
| LAST UPDATE DATE | Y2 YEAR M2 MONTH D2 DATE |
| SYSTEM VERSION OF COMPUTER PROGRAM GROUP | V06-99 |
| EMPLOYED CARRIER | A COMPANY | ated # INFORMATION PROCESSING DEVICE, INFORMATION PROCESSING METHOD AND INFORMATION PROCESSING SYSTEM

CROSS-REFERENCE TO RELATED APPLICATION

This application claims priority to Japanese Patent Application No. 2021-098570 filed on Jun. 14, 2021, incorporated herein by reference in its entirety.

BACKGROUND

1. Technical Field

The present disclosure relates to an information processing device, an information processing method and an information processing system.

2. Description of Related Art

There is a disclosure (Japanese Unexamined Patent Application Publication No. 2017-228103, for example) in which a control device to control the delivery of an update program for an ECU starts a download of the update program when the communication state of a vehicle at a predetermined time point before the start of the download and the communication state of the vehicle from the predetermined time point to the completion of the download are good.

SUMMARY

An aspect of the present disclosure has an object to provide an information processing device, an information processing method and an information processing system that make it possible to stably execute the download of update data for a vehicle during traveling of the vehicle.

An aspect of the present disclosure is
an information processing device including a control unit that executes:
  acquiring a first route based on a communication speed; and
  creating a first plan for a first vehicle, the first plan being a plan about execution of download of first data during traveling along the first route.

Another aspect of the present disclosure is
an information processing method including:
  acquiring a first route based on a communication speed; and
  creating a first plan for a first vehicle, the first plan being a plan about execution of download of first data during traveling along the first route.

Another aspect of the present disclosure is
an information processing system including:
  a first vehicle; and
  an information processing device including a control unit that executes
    acquiring a first route based on a communication speed; and
    creating a first plan for a first vehicle, the first plan being a plan about execution of download of first data during traveling along the first route.

With an aspect of the present disclosure, it is possible to stably execute the download of update data for a vehicle during traveling of the vehicle.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein:

FIG. 2 shows an example of a release note;

FIG. 3 shows an example of a communication speed map;

FIG. 6 shows an example of information relevant to a schedule that is held in a schedule information database in the control center;

FIG. 7 shows an example of vehicle information that is held in a vehicle information database in the control center;

DETAILED DESCRIPTION OF EMBODIMENTS

Figure 1:
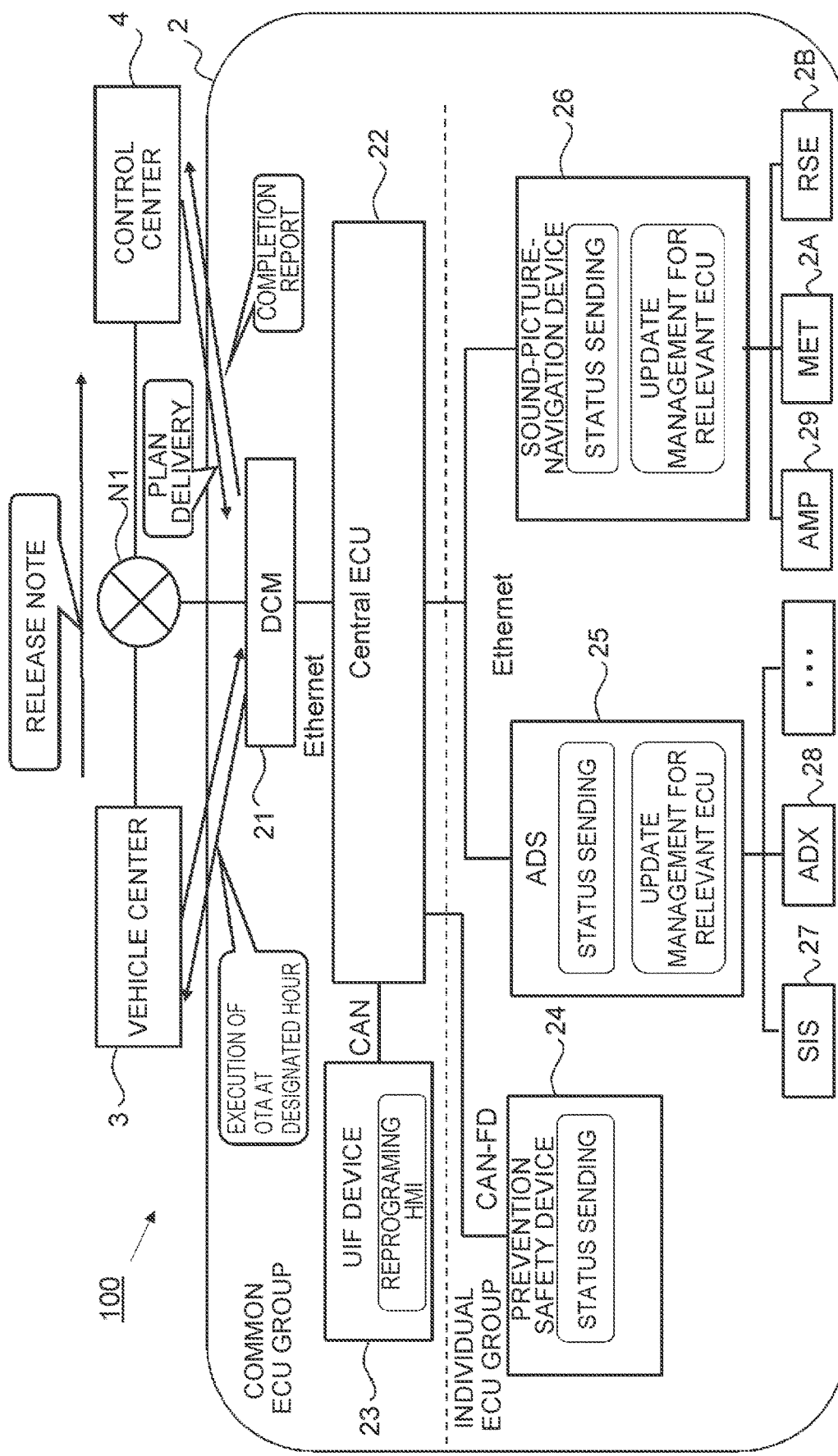
FIG. 1 is a diagram showing an example of a system configuration of an information processing system in a first embodiment.

An aspect of the present disclosure is an information processing device that includes a control unit. The control unit acquires a first route based on a communication speed. The control unit may acquire the first route between two predetermined spots, based on a first map indicating the distribution of the communication speed of a first communication carrier that is employed in a first vehicle. For the first vehicle, the control unit creates a first plan about the execution of download of first data during traveling along the first route.

For example, the first vehicle is an autonomous traveling vehicle or an automatic traveling vehicle. For example, the information processing device is a computer that manages the traveling of the first vehicle, and is a server or a computer that is equipped in the first vehicle. For example, the control unit is a processor such as a control processing unit (CPU). For example, the firs map is referred to as a communication speed map. For example, the first map is divided into areas, based on a measurement result of the communication speed in each spot. The first map is published on the internet for each communication carrier. However, without being limited to this, for example, the first map may be a map that is divided into areas based on a plurality of levels of the theoretical highest receiving speed in a predetermined mobile wireless communication system that is provided by the communication carrier. Examples of the predetermined mobile wireless communication system include long term evolution (LTE) and 5G. The first map exists for each combination of the communication carrier and the mobile wireless communication system.

With an aspect of the present disclosure, the first plan about the execution of the download of the first data by the first vehicle during traveling of the first vehicle is created based on the communication speed. For example, by the acquisition of the first route based on the first map, there is a high possibility that the first route is a route that passes through an area in which the communication can be stably performed, and it is possible to stably perform the download of the first data during traveling of the first vehicle.

In an aspect of the present disclosure, the control unit may acquire, as the first route, a route for which it is predicted that the time spent on the download of the first data is shortest. Thereby, there is a high possibility that it is possible to complete the download of the first data while the first vehicle is traveling along the first route between the two predetermined spots.

An example of the route for which it is predicted that the time spent on the download of the first data is shortest may be a route that passes through an area that is between the two predetermined spots and in which a higher communication speed is obtained. For example, areas are areas into which the first map is divided based on the communication speed.

As the communication speed is higher, the time spent on the download is shorter. Therefore, by creating the route that passes through the area in which the communication speed is higher, it is possible to acquire the route for which it is predicted that the time spent on the download of the first data is shortest.

When a plurality of the first communication carriers is employed in the first vehicle, the control unit may acquire the first route based on respective first maps corresponding to the first communication carriers. Specifically, the control unit may acquire the first route such that the first route passes through an area for a second communication carrier that is of a single or a plurality of area for the first communication carriers between the two predetermined spots and in which a higher communication speed is obtained among the plurality of first communication carriers. The control unit may create the first plan in which the first communication carrier is used in each of a single or a plurality of sections discriminated by the kind of the second communication carrier on the first route. Thereby, when the first vehicle travels along the first route, the first communication carrier that provides the highest communication speed at the traveling position is used. Accordingly, it is possible to stably perform the download of the first data during traveling of the first vehicle.

An example of the first route for which it is predicted that the time spent on the download of the first data is shortest may be a route for which the time spent on the download of the first data is shortest between the two predetermined spots. The time spent on the download of the first data may be acquired based on the size of the first data and the communication speed in a single or a plurality of areas through which the route passes. Thereby, it is possible to more accurately acquire the route for which it is predicted that the time spent on the download of the first data is shortest.

When a plurality of first communication carries is employed in the first vehicle, the control unit may acquire the first route based on the size of the first data and the first map corresponding to each of the first communication carriers. Specifically, the control unit acquires, as the first route, a route that is of a plurality of routes between the two predetermined spots and for which a first time length spent on the download of the first data is shortest when the second communication carrier is used in each of a single or a plurality of sections. The second communication carrier is a communication carrier that is of the first communication carriers employed in the first vehicle and for which the highest communication speed is obtained in a certain spot. The section on the route is a section that is discriminated by the highest communication speed of communication speeds respectively obtained in each spot by the plurality of first communication carriers employed in the first vehicle. The control unit may create the first plan in which the second communication carrier is used in each of the single or the plurality of sections on the first route. Thereby, it is possible to acquire the route for which the first time spent on the download of the first data is shortest between the two predetermined spots, from a standpoint of the communication carrier that is used.

Further, when there is a plurality of second routes for which the first time length is shortest, the control unit may acquire, as the first route, a second route that is of the plurality of second routes and for which the total value of first values is largest. Each of the first values is a value resulting from dividing the communication speed of a second communication carrier that provides the highest communication speed among a plurality of first communication carriers in each of a single or a plurality of sections by the number of contract users of the second communication carrier. Thereby, even when there is a plurality of routes for which the first time spent on the download of the first data is shortest, it is possible to acquire the first route in consideration of the number of contract users of each first communication carrier.

In an aspect of the present disclosure, when a plurality of first communication carriers is employed in the first vehicle, the control unit may acquire the first route based on a relation between the communication speed and the number of the contract users for each of the first communication carriers. For example, there is no guarantee that the communication speed published in the first map is actually obtained, and empirically, the actually obtained communication speed tends to be lower as the number of contract users in a predetermined geographical range is larger. For example, even when first maps show that the communication speed in a predetermined spot is the same between two communication carriers, the actual communication speed tends to be higher in a communication carrier in which the number of contract users is smaller.

That is, there is a predetermined relation between the number of contract users and the communication speed for the first communication carrier. Accordingly, it is possible to acquire the first route for which it is predicted that the time spent on the download of the first data is shortest, based on the relation between the number of contract users and the communication speed for the communication carrier. The number of contract users of the communication carrier is published by the communication carrier, for each local region, each prefecture or each municipality, for example.

For example, the relation between the number of contract users and the communication speed for the communication carrier may be expressed by a first value resulting from dividing the communication speed by the number of contract users of the first communication carrier in a first range including the two predetermined spots. The control unit may acquire, as the first route, a route formed by selecting an area in which the first value is larger, from a single or a plurality of areas for the first communication carriers that is included between the two predetermined spots. Alternatively, the control unit may acquire, as the first route, a route that is of a plurality of routes between the two predetermined spots and for which the total value of largest first values in a single or a plurality of sections is largest. The section on the route is a section that is separated by the largest first value in each spot. The control unit may create the first plan in which a third communication carrier that is of the first communication carriers employed in the first vehicle and for which the first value is largest is used for the download of the first data in each of the single or the plurality of sections on the first route.

The first value resulting from dividing the communication speed by the number of contract users of the communication carrier indicates the communication speed per contract user in the communication carrier, and can be an index for comparing the degree of the communication speed that is actually obtained by the contract user, among communication carriers. The actual communication speed tends to be higher as the first value resulting from dividing the communication speed by the number of contracting users of the communication carrier is larger. Accordingly, in the case of the traveling along the first route acquired using the first value resulting from dividing the communication speed by the number of contract users of the communication carrier, the third communication carrier for which the actual communication speed can be highest is used in each section.

In an aspect of the present disclosure, the control unit may refer to the first map for each of the plurality of the first communication carriers employed in the first vehicle, and may acquire the first route based on the communication speed of each of the first communication carriers and the relation between the communication speed and the number of contract users for each of the first communication carriers. For example, when there is a plurality of routes for which the total value of the largest first values in the single or the plurality of sections is largest, the control unit may acquire, as the first route, a route for which the time spent on the download of the first data is shortest. Thereby, it is possible to accurately acquire the first route for which it is predicted that the time spent on the download of the first data is shortest.

In an aspect of the present disclosure, the first data may be update data for a first program relevant to an electronic control unit (ECU) that is equipped in the first vehicle. In this case, the control unit may acquire information relevant to the first data that includes at least a delivery start date and hour of the update data. When the importance degree of update of the first program is high, the control unit may create the first plan at an earliest hour after the delivery start date and hour of the update data. Further, the control unit may create the first plan such that the update of the first program with the update data is executed in an hour period when the first vehicle does not travel. Thereby, the first vehicle can download the update data for the first program that has a high importance degree, at an earlier hour after the delivery start date and hour. Further, by downloading the update data for the first program during traveling of the first vehicle, it is possible to execute the update of the first program immediately after the first vehicle stops the traveling. For example, even when the time of the state where the first vehicle does not travel is short, it is possible to complete the update of the first program.

Other aspects of the present disclosure can be specified as an information processing method that includes processes in the above-described information processing device, a program for causing a computer to execute processes in the above-described information processing device, and a non-transitory computer-readable recording medium in which the program is recorded. Further, another aspect of the present disclosure can be specified as an information processing system that includes the first vehicle and the above-described information processing device.

Embodiments of the present disclosure will be described below based on the drawing. The configurations of the embodiments described below are examples, and the present disclosure is not limited to the configurations of the embodiments.

First Embodiment

FIG. 1 is a diagram showing an example of a system configuration of an information processing system 100 in a first embodiment. The information processing system 100 includes a vehicle 2, a computer in a vehicle center 3, and a computer in a control center 4. Hereinafter, the computer in the vehicle center 3 is also referred to as merely the vehicle center 3, and the computer in the control center 4 is also referred to as merely the control center 4. The vehicle 2, the vehicle center 3 and the control center 4 are connected through a network N1.

The network N1 includes a wired network and a wireless network. For example, the wired network is also called a core network, a backbone or the like, and is a broadband network, as exemplified by an optical fiber network. Examples of the wireless network include a cellular phone network such as a long term evolution (LTE), a fifth generation mobile communication system (5G) and a sixth generation mobile communication system (6G).

For example, the vehicle 2 is a vehicle. The vehicle may be a four-wheeled vehicle, a three-wheeled vehicle or a two-wheeled vehicle. The vehicle may be driven by an engine, or may be driven by a motor. The vehicle may be a vehicle equipped with an automatic driving system that allows autonomous traveling or automatic traveling. The vehicle 2 is an example of "first vehicle".

As shown in FIG. 1, the vehicle 2 includes a data communication module (DCM) 21, a central electronic control unit (central ECU) 22, a user interface (UIF) device 23, a prevention safety device 24, an advanced drive system (ADS) 25 and a sound-picture-navigation device 26.

The DCM 21 accesses the network N1, and communicates with another mobile object, the vehicle center 3, the control center 4 or the like. The DCM 21 can perform wireless communication through a mobile communication network.

The central ECU 22 manages apparatuses in the vehicle 2. For example, the central ECU 22 includes a processor and a memory. The processor executes a computer program on the memory, and executes a process as the central ECU 22. For example, the central ECU 22 updates a computer program that is executed by an ECU equipped in each apparatus in the vehicle 2, and manages the progress of the update. Further, the central ECU 22 detects an error when the computer program is updated, and executes a process at the time of the occurrence of the error. The combination of the central ECU 22 and the DCM 21 is an example of a computer that is equipped in the vehicle.

For example, the UIF device 23 provides a user interface at the time of the update of the computer program that is executed by the ECU equipped in each apparatus in the vehicle 2. The user interface is also called a reprograming human machine interface (reprograming HMI). The UIF device 23 includes the same ECU as the central ECU 22. The central ECU 22, the ECU in the UIF device 23 and the like can be referred to as a common ECU group.

The prevention safety device 24 incorporates an ECU, and executes a collision avoidance assist process by processing of a computer program. For example, the prevention safety device 24 executes a collision avoidance support, a lane departure notification, an automatic high beam, a radar cruise control, and others, based on signals from sensors such as a radar and a camera.

The ADS 25 is connected with a spatial information service (SIS) 27, an advanced drive extension (ADX) 28 and the like. Each of the ADS 25, the SIS 27 and the ADX 28 incorporates an ECU, and executes a high-grade advanced driving assist process by processing of a computer program. For example, the ADS 25 detects a vehicle, a three-dimensional object or the like in the periphery of the vehicle 2 by a detection signal from a light detection and ranging (LiDAR), estimates the position of the vehicle 2, and executes a driving control.

The SIS 27 provides the attitude of the vehicle 2, the position of the vehicle 2 on a map, and the like, to the ADS 25. That is, the SIS 27 acquires position information from a global navigation satellite system (GNSS) or a global positioning system (GPS), a six-axis acceleration signal from a gyroscope sensor, a route information or map information from a navigation system, and the like. The SIS 27 calculates the attitude of the vehicle 2, the position of the vehicle 2 on the map, and the like, based on the acquired information. The ADX 28 applies an artificial intelligence (AI) system, recognizes information from the above various sensors and the like, processes the information, and gives notice of a processing result to the ADS 25.

The sound-picture-navigation device 26 is connected with an automated mapping platform (AMP) 29, a MET 2A and a rear seat entertainment (RSE) 2B. Each of the sound-picture-navigation device 26, the AMP 29, the MET 2A and the RSE 2B incorporates an ECU, and provides various functions using sounds, pictures, map information and the like, to a user of the vehicle 2, by processing of a computer program.

The AMP 29 generates map information from data such as images that are collected by sensors including the camera equipped in the vehicle 2. In the case where the vehicle 2 is a vehicle that includes a backseat, the RSE 2B, at the backseat in a vehicle cabin, independently provides a television broadcast and a digital versatile disc (DVD) picture, to a user that sits on the back seat.

The ECUs of the prevention safety device 24, the ADS 25 and the sound-picture-navigation device 26 and the ECUs of devices connected with the prevention safety device 24, the ADS 25 and the sound-picture-navigation device 26 can be referred to as an individual ECU group. The central ECU 22 manages the progress of the update of each computer program equipped in the individual ECU group and the error at the time of update.

The vehicle center 3 is operated by an organization such as a company that sells the vehicle 2 or maintains the vehicle 2, or a company or the like that is trusted by the company or the like that sells the vehicle 2 or maintains the vehicle 2. The vehicle center 3 manages components such as ECUs equipped in all mobile objects that are sold or maintained by the company or the like. Further, the vehicle center 3 manages the kind and version of each of computer programs that are executed by the ECUs. The vehicle center 3 delivers update data for updating the computer programs, to the vehicle 2 or the like. The update data can be also referred to merely an update program.

The control center 4 manages the traveling, maintenance and others of each vehicle 2. For example, the control center 4 is a computer of a FMS company that provides a fleet management service (FMS). The control center 4 manages a schedule for sharing use in a service that is irregularly used, for example, in a ride-sharing service. The schedule includes a traveling start date and hour, traveling end date and hour, and maintenance date and hour for the vehicle 2. Further, the control center 4 manages a schedule for lending of the vehicle 2 that is used by renting. The control center 4 updates the schedule on a timely basis, distributes the schedule to the vehicle 2, and manages the operation of the vehicle 2. Hereinafter, the term "schedule" means an overall timeline such as a day, a week or a month, or means an item about the execution of a single or a plurality of events such as the movement between two predetermined spots and the update of a program. For example, in the case of "create a schedule" or "make a schedule", an item of the schedule is mentioned.

As described above, the vehicle 2 is equipped with various components that incorporate ECUs. The computer program that is executed by the ECU in each component is updated for improvement or defect measure. For the vehicle 2, safety is required. Therefore, the update of the computer program for the ECU equipped in the vehicle 2 is executed during a maintenance period in which the vehicle 2 does not travel.

The vehicle center 3 gives notice of the latest update content about the computer program for each ECU and the schedule for the delivery of the update data, to the control center 4, in a form of a release note. When the control center 4 receives the release note, the control center 4 fits the update of the computer program for each ECU, in the schedule for each vehicle 2. That is, the control center 4 makes the schedule for each vehicle 2, such that the update of the computer program for each ECU is completed during the maintenance period in which the vehicle 2 does not travel. The control center 4 gives notice of the fixed schedule to the vehicle 2 (PLAN DELIVERY in FIG. 1), and causes the vehicle 2 to update the computer program for each ECU.

The DCM 21 of the vehicle 2 communicates with the vehicle center 3 and the control center 4 through the network N1. The DCM 21 receives the schedule including the update of the computer program, from the control center 4 (PLAN DELIVERY in FIG. 1). The central ECU 22 is connected with the DCM 21, for example, through a network in the mobile object, as exemplified by Ethernet (registered trademark).

In accordance with the received schedule, the DCM 21 accesses the vehicle center 3, acquires the update data for updating the computer program, and transfers the update data to the central ECU 22. The central ECU 22 updates the computer programs for the ECUs including the common ECU group and the individual ECU group, during the maintenance period in which the vehicle 2 is in the stop state. After the completion of the update for each ECU by the central ECU 22, the DCM 21 gives notice of a completion report to the control center 4.

For example, the UIF device 23 is connected with the central ECU 22 through a network in the mobile object, as exemplified by controller area network (CAN (registered trademark)). The UIF device 23 may accept an input of confirmation by user's operation, through the reprograming HMI. That is, the central ECU 22 may ask the user for the confirmation of the start of the update of the computer program, using the UIF device 23, and may start the update after the confirmation is obtained. The UIF device 23 itself also acquires the update data from the central ECU 22, and updates the computer program for the UIF device 23.

For example, the prevention safety device 24 is connected with the central ECU 22 through a network in the vehicle 2, as exemplified by controller area network with flexible data rate (CAN-FD (CAN is a registered trademark)). The prevention safety device 24 receives the update data for the computer program from the central ECU 22, and executes the update. Then, the prevention safety device 24 reports a status due to the update, to the central ECU 22.

For example, the ADS 25 and the sound-picture-navigation device 26 are connected with the central ECU 22 through a network in the mobile object, as exemplified by Ethernet (registered trademark). Each of the ADS 25 and the sound-picture-navigation device 26 receives the update data for the computer program, from the central ECU 22. Each of the ADS 25 and the sound-picture-navigation device 26 executes the update of the computer program for its ECU and the computer program for an ECU of an internal device. Each of the ADS 25 and the sound-picture-navigation device 26 reports a status due to the update, to the central ECU 22.

In the first embodiment, in the case where the importance degree of the update included in the release note from the vehicle center 3 is high, the control center 4 creates a schedule for causing the vehicle 2 to perform the update after the delivery start date and hour of the update data as early as possible. Examples of the update with a high importance degree include updates for the prevention safety device 24 and the ADS 25 for traveling and safety, and an update for recovery from a fault. Specifically, the control center 4 creates a schedule for causing the vehicle 2 to download the update data during traveling after the delivery start date and hour of the update data and thereafter causing the vehicle 2 to perform the update during the maintenance period in which the vehicle 2 does not travel. The update process for the program includes a process of the download of the update data and a process of data rewriting with the update data. In the first embodiment, an expression "schedule for update" means the schedule for the process of data rewriting with the update data. In the update process for the program, a new program is sometimes installed, and in this case, an installation process for the program is performed instead of the rewriting of the program.

In the case of causing the vehicle 2 to download the update data during traveling, it is preferable to cause the vehicle 2 to travel along a route on which communication can be stably performed, such that communication is not disrupted in the middle of the download. In the first embodiment, the route on which communication can be stably performed is a route on which the update data can be downloaded in a shorter time. The control center 4 acquires the route on which the update data can be downloaded in a shorter time, creates a schedule for causing the vehicle 2 to download the update data during traveling along the route, and gives notice of the schedule to the vehicle 2.

In the first embodiment, the control center 4 acquires the route on which the update data can be downloaded in a shorter time, based on the communication speed. For example, the communication speed is acquired from the communication speed map that is published on the internet. For example, the communication speed map may be a map on which measurement results of spot downstream communication speeds in a predetermined mobile communication system provided by the communication carrier are plotted. However, without being limited to this, the communication speed map may be a map that shows theoretical downstream communication speeds. The downstream communication speed is a speed of communication from a base station to a terminal, and is also called a receiving communication speed.

FIG. 2 shows an example of the release note. The release note is sent from the vehicle center 3 to the control center 4. In the example shown in FIG. 2, in the release note, a value for a keyword is designated in a form of "keyword: value". Further, in the example shown in FIG. 2, sets of "keyword: value" are contained in curly braces, and the release note is hierarchically written.

In the example shown in FIG. 2, as keywords, the release note includes the type of the vehicle (vehicle type), the version of a system that is released (System Version), the delivery start date and hour (release date), the type of the ECU (ECU type), the kind of a program that is released (Program type), the version of a program that is released (Version) and the size of the update data (volume).

That is, in the example shown in FIG. 2, the release note shows that the type of the vehicle 2 is E-palette GO, the version of the system is V07-01, and the delivery of the update data is started on a date and hour of ddmmmyyyy. The version of the system (System Version) is a version that is given to the whole of a computer program group that is installed in the vehicle 2. Further, in the release note, the kind of the program, the version, the data size of the update data (data amount, volume) and others are written for each type of the ECU (ECU type). For example, the version of PC1 that is a program for the central ECU is V07-01-1, and the data size is V1 MB.

The form of the release note is not limited to the example shown in FIG. 2. For example, the release note may written in a prescribed format such as hypertext markup language (HTML) or extensible markup language (XML). Further, the release note may be written in a tabular form in which records including a plurality of elements are arrayed.

FIG. 3 shows an example of the communication speed map. FIG. 3 is a communication speed map in a predetermined mobile communication system provided by a certain communication carrier. The communication speed map is a map that is divided into areas based on the ranges of the communication speeds obtained by the communication carrier. In the example shown in FIG. 3, the map is divided into areas based on two ranges: a range of X1 Mbps to X2 Mbps (X1<X2) and a range of Y1 Kbps to Y2 Kbps (Y1<Y2).

In the example shown in FIG. 3, the area in which the communication speed in the range of X1 Mbps to X2 Mbps (X1<X2) is obtained includes an area 81, an area 82 and an area 83. In the FIG. 3, the range other than the area 81, the area 82 and the area 83 is an area in which the communication speed in the range of Y1 Kbps to Y2 Kbps (Y1<Y2) is obtained.

In the case where the communication speed map is divided in to areas based on a plurality of ranges of predetermined communication speeds as the example shown in FIG. 3, for example, a minimum value, a maximum value, a median value or an average value in a range of a corresponding communication speed is used as a representative value of the communication speed that is obtained in each area. Hereinafter, the communication speed that is obtained in the area or the communication speed in the area means a representative value in the range of the communication speed in the corresponding area. In the information processing system 100, the representative value of the communication speed in the area is common among communication carriers and mobile communication systems. The communication speed map shown in FIG. 3 is an example, and the communication speed map is not limited to the map shown in FIG. 3. The communication speed map is an example of the "first map".

Figure 4:
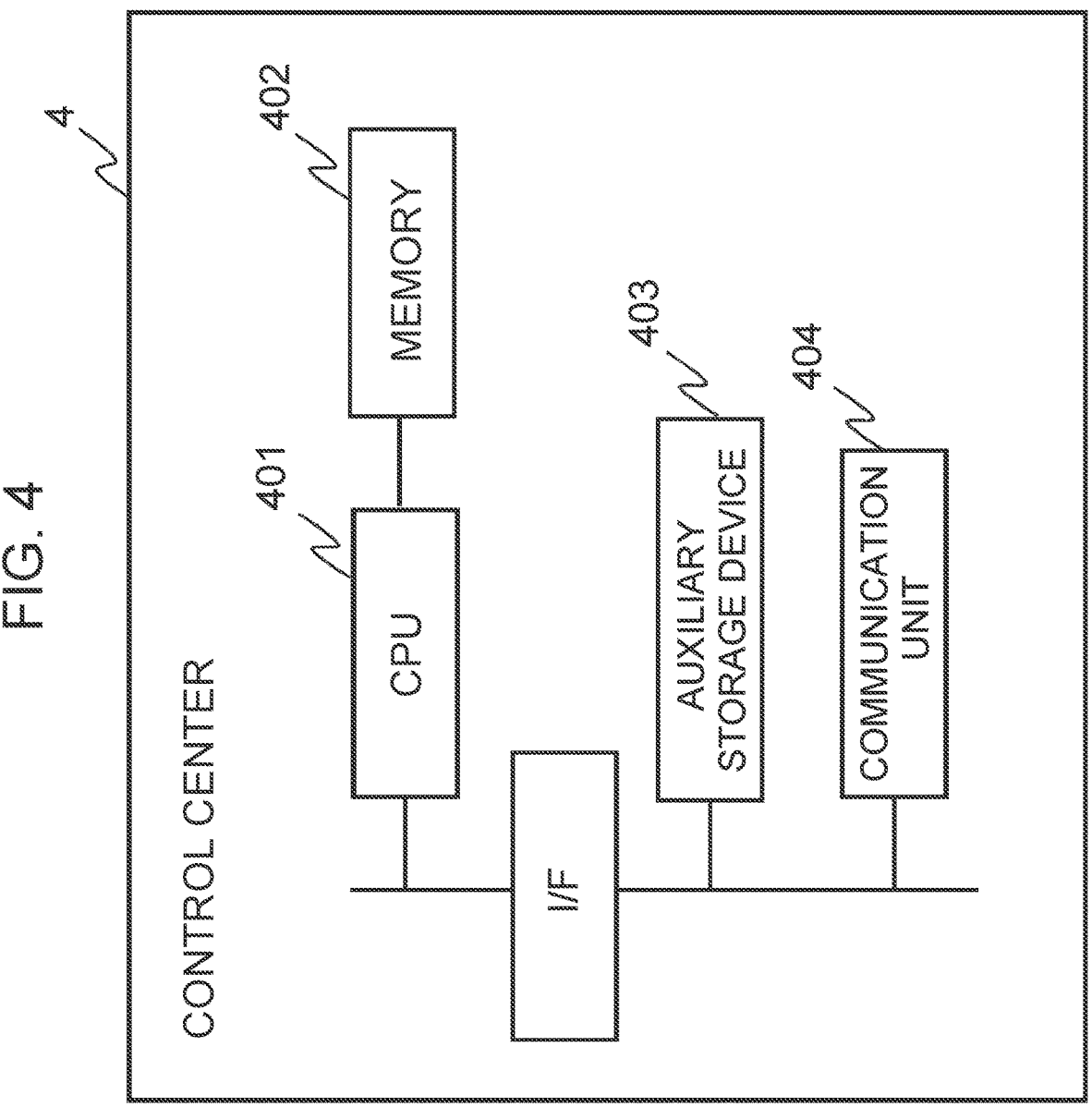
FIG. 4 is a diagram showing an example of a hardware configuration of a computer in a control center.

FIG. 4 is a diagram showing an example of a hardware configuration of the control center 4. For example, the control center 4 is a server. The control center 4 includes a CPU 401, a memory 402, an auxiliary storage device 403 and a communication unit 404, as the hardware configuration. The computer in the control center 4 is an example of the "information processing device".

The CPU 401 is connected with an external apparatus through an interface (I/F), and executes a predetermined process by executing a program. The CPU 401 is a processor. The CPU 401 is not limited to a single processor, and may have a multiprocessor configuration. Further, the CPU 401 may include a graphics processing unit (GPU), a digital signal processor (DSP), or the like. Further, the CPU 401 may cooperate with a hardware circuit such as a field programmable gate array (FPGA). As the external apparatus connected with the CPU 401 through the interface (I/F), there are the auxiliary storage device 403 and the communication unit 404. In addition, for example, an output device such as a display and an input device such as a keyboard and a mouse may be connected with the CPU 401 through the interface (I/F). The CPU 401 is an example of the "control unit".

The CPU 401 executes a computer program expanded on the memory 402 in an executable manner, and provides the function of the control center 4. The memory 402 stores a computer program that is executed by the CPU 401, data that is processed by the CPU 401, and the like. The memory 402 is a dynamic random access memory (DRAM), a static random access memory (SRAM), a read only memory (ROM) or the like. For example, the auxiliary storage device 403 is used as a storage region that assists the memory 402. The auxiliary storage device 403 stores a computer program that is executed by the CPU 401, data that is processed by the CPU 401, and the like. The auxiliary storage device 403 is a hard disc drive, a solid state disk (SSD), or the like. In the control center 4, a drive device for a detachable storage medium may be provided. For example, the detachable storage medium is a Blu-ray disc, a digital versatile disk (DVD), a compact disc (CD), a flash memory card, or the like.

The communication unit 404 exchanges data with other devices on the network. For example, the communication unit 404 communicates with the DCM 21 through the network N1. For example, the communication unit 404 is a wired network card such as a local area network (LAN) and an exclusive line, and is connected with the network N1 through an access network such as the LAN. The hardware configuration of the control center 4 is not limited to the hardware configuration shown in FIG. 4.

Similarly to the control center 4, the vehicle center 3 includes a CPU, a memory, an auxiliary storage device and a communication unit. The DCM 21 includes a CPU, a memory, an auxiliary storage device and a wireless communication unit. For example, the wireless communication unit included in the DCM 21 is a wireless communication circuit for a mobile communication system such as 5G, LTE, LTE-Advanced and 3G, or a wireless communication system such as Wi-Fi. The wireless communication unit is connected with an access network by wireless communication, and is connected with the network N1 through the access network.

Figure 5:
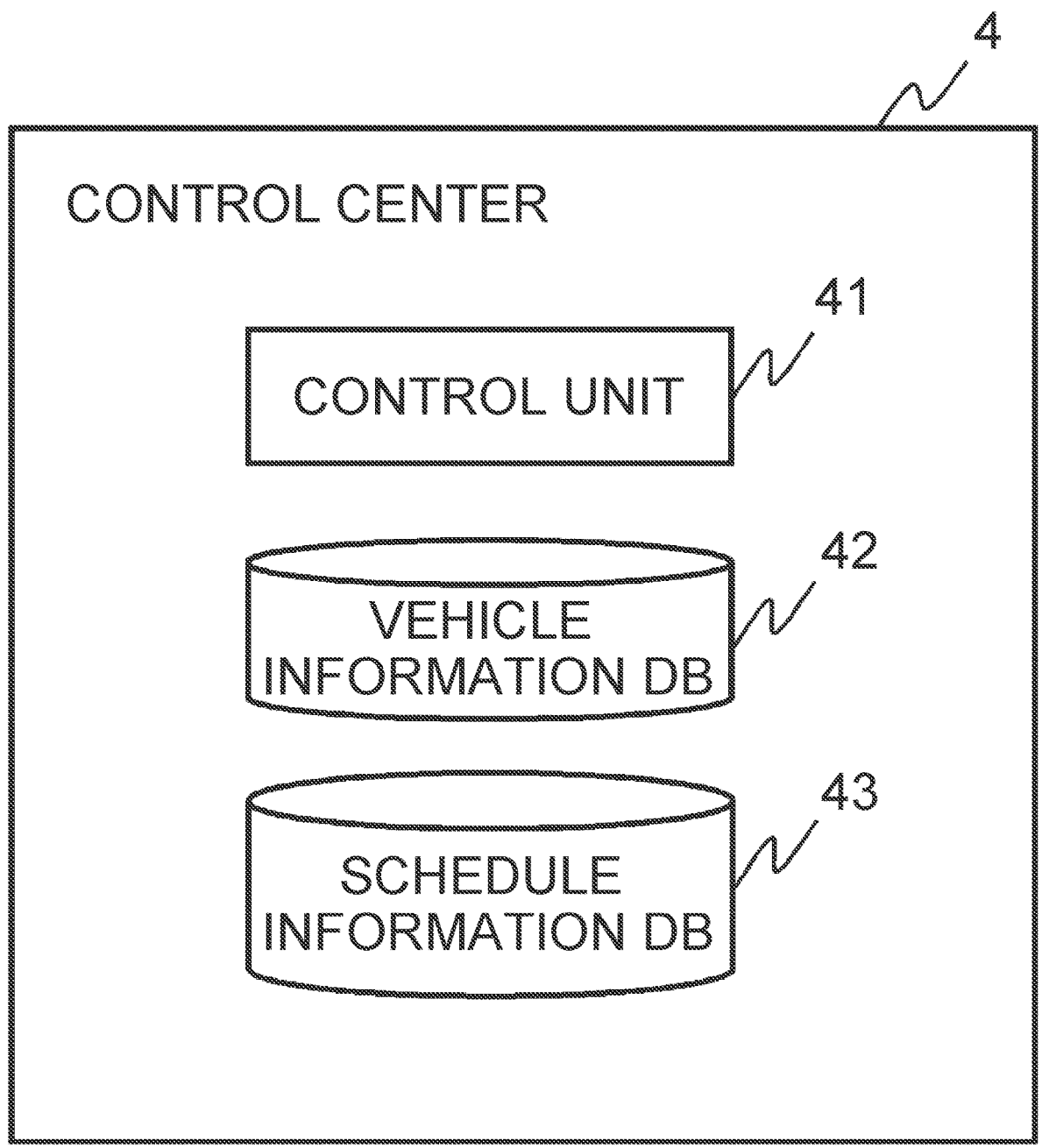
FIG. 5 is a diagram showing an example of a functional configuration of the computer in the control center.

FIG. 5 is a diagram showing an example of a functional configuration of the control center 4. The control center 4 includes a control unit 41, a vehicle information database (DB) 42 and a schedule information DB 43, as the functional configuration. For example, the functional configuration elements are achieved when the CPU 401 of the control center 4 executes predetermined programs.

The control unit 41 manages the traveling of the vehicle 2. The control unit 41 receives the release note from the vehicle center 3 through the communication unit 404. When the control unit 41 receives the release note, the control unit 41 extracts vehicles 2 for which the update of the program is performed, and creates respective update schedules for the vehicles 2. In the first embodiment, for updates with high importance degrees, the control unit 41 creates the schedule such that the updates are executed as early as possible. For other updates, for example, the control unit 41 fits the download and update of the update data shown by the release note, in a first maintenance schedule after the delivery start date and hour of the release note.

The control unit 41 determines whether the importance degree of the update shown by the release note is high. The control unit 41 determines whether the importance degree of the update shown by the release note is high, for example, from the content of the release note. The control unit 41 may determine whether the importance degree of the update shown by the release note is high, for example, based on information that is included in the release note and that indicates the type of the ECU as an update target, the type of the program as an update target, and the like. Examples of the ECU for which it is determined that the importance degree of the update is high include the central ECU 22, the prevention safety device 24 and the ADS 25. However, the ECU for which it is determined that the importance degree of the update is high is not limited to them. Further, the release note itself may include information indicating the importance degree of the update, and the control unit 41 may determine whether the importance degree of the update shown by the release note is high, based on the information. Examples of the information indicating the importance degree of the update and included in the release note include a flag that is turned on when the importance degree is high, and a code indicating the importance degree.

In the case where the importance degree of the update shown by the release note is high, the control unit 41 acquires the schedule for the vehicle 2 on the delivery start date and hour included in the release note, by referring to the schedule information DB 43. In the case where the schedule for the vehicle 2 on the delivery start date and hour is not relevant to traveling, the control unit 41 creates a schedule for starting the download of the update data shown by the release note on the delivery start date and hour and thereafter performing the update. The control unit 41 gives notice of the created schedule to the vehicle 2, and registers the created schedule in the schedule information DB 43.

In the case where the schedule for the vehicle 2 on the delivery start date and hour is a schedule including traveling, the control unit 41 recreates the schedule by fitting the download of the update data shown by the release note during traveling, in the schedule after the delivery start date and hour. Further, for example, the control unit 41 fits the update shown by the release note using the downloaded update data, in the schedule for the first maintenance after delivery start date and hour in the release note. Further, the control unit 41 gives notice of the recreated schedule to the vehicle 2, and registers the recreated schedule in the schedule information DB 43.

The process of recreating the schedule by fitting the download of the update data shown by the release note during traveling in the schedule after the delivery start date and hour in the case where the schedule for the vehicle 2 on the delivery start date and hour includes traveling will be specifically shown below. Hereinafter, the delivery start date and hour and the update data means the delivery start date and hour shown by the received release note and the update data shown by the received release note, respectively.

For example, the control unit 41 acquires the first route between a predicted traveling position of the vehicle 2 on the delivery start date and hour and a destination in the schedule on the delivery start date and hour. The control unit 41 acquires, as the first route, a route for which it is predicted that the time spent on the download of the update data is shortest. In the first embodiment, the control unit 41 acquires the time spent on the download of the update data, based on the communication speed that is obtained by the vehicle 2, and acquires the first route. Descriptions will be made below assuming that a single communication carrier is employed in the vehicle 2.

First, the control unit 41 acquires the predicted traveling position of the vehicle 2 on the delivery start date and hour, based on schedule information about the schedule for the vehicle 2 on the delivery start date and hour, by referring to the schedule information DB 43, for example. In the case where the content of the schedule is movement, the schedule information includes a departure place, a destination, an expected departure hour, an expected arrival hour and route information from the departure place to the destination, for example. For example, the route information includes a road through which the vehicle 2 passes, a spot through which the vehicle 2 goes, and the like. For example, the control unit 41 estimates the predicted traveling position of the vehicle 2 on the delivery start date and hour, based on the route information included in the schedule information corresponding to the vehicle 2. The estimation method for the traveling prediction position of the vehicle 2 may be any well-known technology, and is not limited to a particular method.

Next, the control unit 41 acquires the communication speed map for the communication carrier employed in the vehicle 2, and acquires the first route based on the communication speed between the predicted traveling position of the vehicle 2 on the delivery start date and hour and the destination. As the acquisition method for the first route, for example, there are two methods described below. In the following, an area is an area that is separated on the communication speed map by the kind of the range of the communication speed. Further, two spots mean the predicted traveling position of the vehicle 2 and the destination, and the predicted traveling position is the departure spot of the first route.

(1) A route that passes through an area that is of a single or a plurality of areas between the two spots and in which a higher communication speed is obtained is acquired as the first route. More specifically, for example, the control unit 41 acquires the route so as to select an area that exists at a position closest to the current position in a direction from the departure spot to the destination spot and in which a higher communication speed is obtained. In the example of the communication speed map shown in FIG. 3, the control unit 41 creates a route along which the vehicle 2 passes through an area 82 that is closest to the destination side from the departure place and in which a higher communication speed (X1 Mbps to X2 Mbps in FIG. 3) is obtained, passes through an area 81 that is closest to the destination side from the area 82 and in which a higher communication speed (X1 Mbps to X2 Mbps in FIG. 3) is obtained, and arrives at the destination.

(2) A plurality of routes between the two spots is acquired, the time length spent on the download of the update data is calculated for each route, and a route for which the time length spent on the download is shortest is acquired as the first route. For example, the acquisition method for the route between the two spots may be any well-known route search method. For example, a plurality of routes for which the time or distance from the departure place to the destination is acquired. For each route, the control unit 41 calculates the time length spent on the download of the update data, from the size of the update data and the communication speed. The communication speed is obtained from the communication speed map. The representative value in the range of the communication speed in the area is used for the calculation of the time length spent on the download of the update data.

First, for each route, the control unit 41 acquires sections that are separated by communication speeds obtained in spots. Next, the control unit 41 evaluates the time of traveling for each section, and evaluates a data size that can be downloaded, from the time of traveling and the obtained communication speed. The control unit 41 evaluates the time length spent on the download of the update data when the vehicle 2 travels along the route, from the data size that can be downloaded in each section and the size of the update data. For example, a case where the route has two sections: a section #1 that passes through an area A in which the representative value of the communication speed is 10 Mbps and a section #2 that passes through an area B in which the presentative value of the communication speed is 5 Mbps will be described. The size of the update data is 1 GB.

In the case where a time length during which the vehicle 2 travels in the section #1 is 10 minutes, the data size that is downloaded in the section #1 at the communication speed of 10 Mbps is 10 Mbps×60 seconds×10 minutes÷ 8 bits=750 MB. For the update data having 1 GB, 750 MB is downloaded in the section #1, and the remaining 274 MB is downloaded in the section #2.

A time spent on the download of 274 MB in the section #2 at the communication speed of 5 Mbps is 274 MB×8 bits÷ 5 Mbps÷ 60 seconds=about 7.3 minutes. In the case where a time during which the vehicle 2 travels in the section #2 is 7.3 minutes or longer, the download of the update data having 1 GB is theoretically completed during traveling along the route, and the time spent on the download is about 18 minutes.

A time length during which the vehicle 2 travels in a section is acquired by dividing the distance of the section by the speed of the vehicle 2. For example, the speed of the vehicle 2 that is used for the calculation is set to 40 km/h. However, the speed of the vehicle 2 that is used for the calculation is not limited to this.

The control unit 41 acquires the first route by the method (1) or the method (2). Which method is used depends on the selection by a designer of the information processing system 100, for example. When the control unit 41 acquires the first route, the control unit 41 creates a schedule for starting the traveling along the first route and the download of the update data on the delivery start date and hour, and registers the created schedule in the schedule information DB 43 as the schedule for the vehicle 2. Further, the control unit 41 sends the created schedule to the vehicle 2. Thereby, the vehicle 2 starts the traveling along the first route and the download of the update data on the delivery start date and hour.

The download of the update data does not need to be completed during traveling along the first route. For example, in the method (2), in the case where it is not possible to acquire a route for which the download of the update data can be completed during traveling, a route for which the largest amount of data can be downloaded may be selected as the first route. For example, in the case where the download of the update data is not completed during traveling along the first route, the control unit 41 may create a schedule for causing the vehicle 2 to continuously perform the download of the update data even after the traveling of the vehicle 2, and may send the created schedule to the vehicle 2.

The vehicle information DB 42 and the schedule information DB 43 are created in a storage region within the auxiliary storage device 403 of the control center 4. The vehicle information DB 42 holds information relevant to the vehicle 2. The schedule information DB 43 holds information relevant to the schedule for the vehicle 2.

FIG. 6 shows an example of the information relevant to the schedule that is held by the schedule information DB 43 of the control center 4. The schedule is created for each vehicle 2. The information relevant to the schedule shown in FIG. 6 includes matters "vehicle ID", "year-month-date", "hour period" and "item". In the matter "vehicle ID", identification information about the vehicle 2 is stored. In the matter "year-month-date", the year-month-date of the corresponding schedule is stored. That is, in the example shown in FIG. 6, the schedule is created on a daily basis. In the matter "hour period", information indicating each hour period is stored.

In the matter "item", information relevant to an item is stored. The information relevant to the item is referred to as schedule information. As the schedule information, for example, information indicating the kind of the item is stored. Examples of the kind of the item include "traveling", "download" and "update". However, the kind of the item is not limited to them.

In the case where the kind of the item is "traveling", the schedule information includes information indicating whether the traveling is a traveling for movement or a traveling for service provision, the departure place, the destination and the route information, for example. The schedule information includes also the start hour and end hour of the item. The start hour and end hour of the item are also referred to as the expected departure hour and the expected arrival hour, respectively. Examples of the service that provides traveling include a dispatch service and a ride-sharing service. In the case of the traveling for service provision, the schedule information may include information relevant to the service. Examples of the information relevant to the service include identification information about the user and reservation information. For example, the reservation information includes a hoped getting-in hour, an expected arrival hour, a getting-in place, a getting-off place and others that are designated by the user. In the example shown in FIG. 6, items are disposed in a period from the start hour to the end hour.

In the case where the kind of the item is "download", the schedule information includes a start hour, the file name of a download object, and others, for example. The schedule information may include an expected end hour of the download. In the case where the kind of the item is "update", the schedule information includes a start hour and identification information about the update data, and others, for example. In a single item, a plurality of kinds is sometimes included. For example, in the case where the download is performed during traveling, the kind of the item includes "traveling" and "download".

For example, FIG. 6 shows a schedule in which the vehicle ID is E-PALETTE EV1 and the year-month-date is DDMMMYYYY. The vehicle 2 with the vehicle ID: E-PALETTE EV1 is in a standby state from 0:00 to 9:00, because no item is set. The vehicle 2 with the vehicle ID: E-PALETTE EV1 starts the traveling at 9:00. The traveling from 9:00 is a movement for the next schedule, with no user. The vehicle 2 with the vehicle ID: E-PALETTE EV1 performs the traveling for service provision from 9:45 to 11:00.

The vehicle 2 with the vehicle ID: E-PALETTE EV1 performs the traveling for movement and the download during traveling, from 11:00 to 12:00. The vehicle 2 with the vehicle ID: E-PALETTE EV1 stops the traveling and performs the update at 12:00. Thereafter, the vehicle 2 with the vehicle ID: E-PALETTE EV1 travels from 13:00 to 23:00, and stops the operation at 23:00, so that the vehicle 2 becomes the standby state. In the example shown in FIG. 6, details of the schedule from 13:00 to 22:00 are omitted.

For example, in the case where the schedule is altered, the control unit 41 may send the whole schedule of the day to the vehicle 2, or may extract and send the schedule information about an altered item. For example, in the case where an item for the traveling for movement and the download during traveling from 11:00 to 12:00 and an item for the update from 12:00 to 13:00 are added as items for the vehicle 2 with the vehicle ID: E-PALETTE EV1 shown in FIG. 6 due to the receiving of the release note, the control unit 41 may send the whole schedule that is on the year-month-date DDMMMYYYY and that includes schedule information about the two items, to the vehicle 2. Alternatively, the control unit 41 may send only the schedule information about the two added items, to the vehicle 2. In the case where a different item is altered due to the addition of the two items, schedule information about the different item is also sent to the vehicle 2.

The schedule shown in FIG. 6 is an example, and the schedule that is created by the control center 4 is not limited to the schedule shown in FIG. 6. For example, the operation schedule does not need to be created on a daily basis, and may be created on a weekly basis, for example. Further, the operation schedule may be created on a monthly basis. Further, the schedule may be created for each of a weekday (Monday to Friday), Saturday and a holiday.

FIG. 7 shows an example of the vehicle information that is held in the vehicle information DB 42 of the control center 4. The vehicle information is information relevant to the vehicle 2. The vehicle information is held in the vehicle information DB 42 of the control center 4. In the example shown in FIG. 7, the vehicle information has matters "vehicle ID", "last update date", "system version of whole computer program group" and "employed carrier".

In the matter "vehicle ID", the identification information about the vehicle 2 is stored. In the matter "last update date", an update date when a computer program group for the respective ECUs in the vehicle 2 was updated last time is stored. In the matter "system version of whole computer program group", the version of the updated computer program group in the vehicle 2 is stored.

In the matter "employed carrier", information indicating the communication carrier that is employed in the vehicle 2 is stored. For example, the information indicating the communication carrier is a code or a communication carrier name. In the case where a plurality of communication carriers is employed in the vehicle 2, information indicating the plurality of communication carriers that is employed in the vehicle 2 is stored in the matter "employed carrier". The vehicle information shown in FIG. 7 is an example, and the information that is included in the vehicle information is not limited to the information shown in FIG. 7.

Processing Flow

Figure 8:
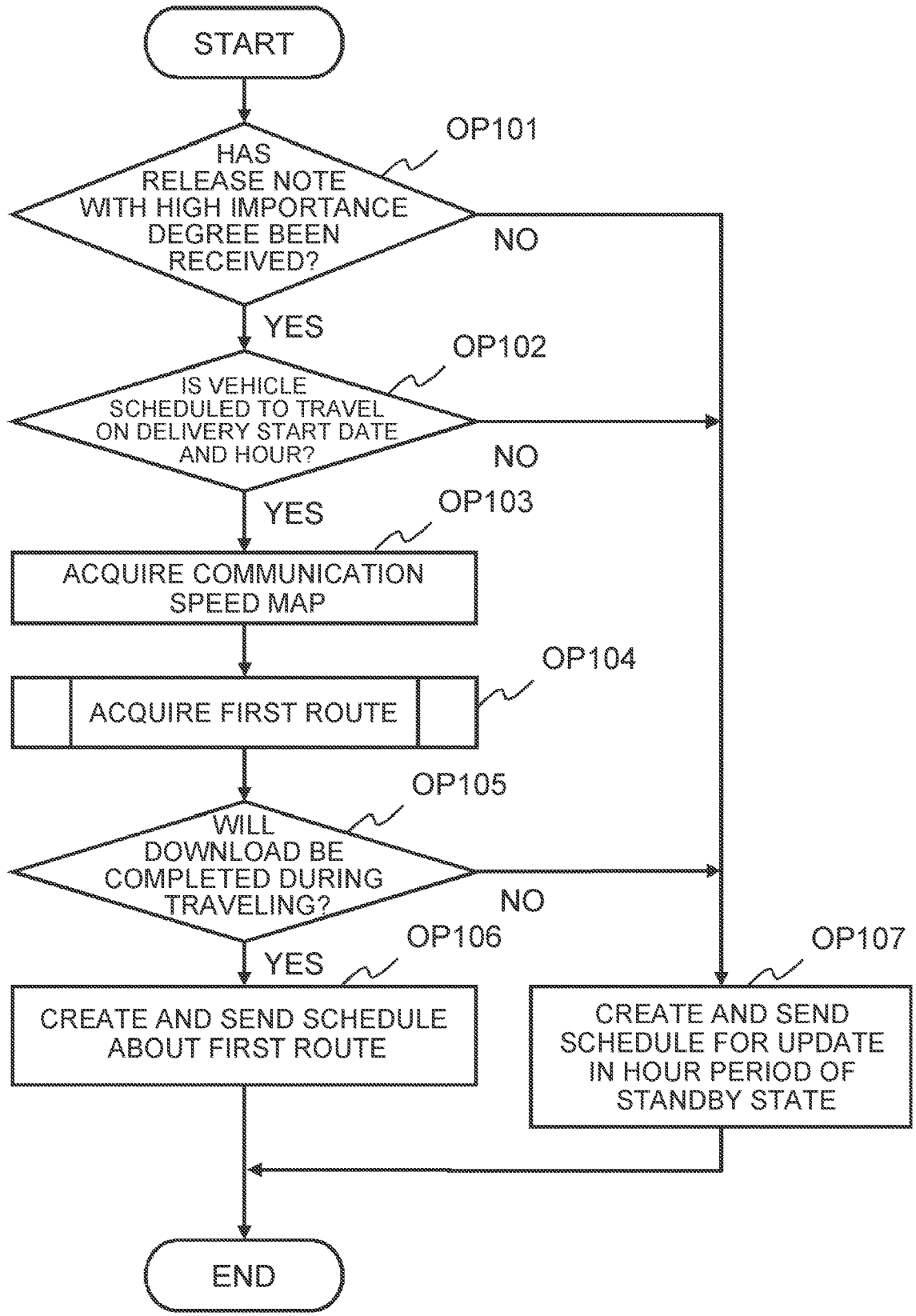
FIG. 8 shows an example of a flowchart of a creation process for an update schedule due to receiving of the release note by the control center.

FIG. 8 shows an example of a flowchart of a creation process for the update schedule due to the receiving of the release note by the control center 4. The process shown in FIG. 8 is executed for each vehicle 2. The process shown in FIG. 8 is started when the control center 4 receives the release note corresponding to the vehicle 2, from the vehicle center 3. The execution subject of the process shown in FIG. 8 is the CPU 401 of the computer in the control center 4, but for convenience, descriptions will be made while a functional configuration element is regarded as the subject. The same goes for the other flowcharts.

In OP101, the control unit 41 determines whether the release note with a high importance degree has been received. In the case where the release note with a high importance degree has been received (OP101: YES), the process proceeds to OP102. In the case where the release note with a high importance degree has not been received (OP101: NO), the process proceeds to OP107.

In OP102, the control unit 41 refers to the schedule information DB 43, and determines whether the vehicle 2 will travel on the delivery start date and hour, that is, whether the schedule for the vehicle 2 on the delivery start date and hour is the schedule of the traveling. In the case where the vehicle 2 will travel on the delivery start date and hour (OP102: YES), the process proceeds to OP103. In the case where the vehicle 2 will not travel on the delivery start date and hour (OP102: NO), the process proceeds to OP107.

In OP103, the control unit 41 acquires the communication speed map for the communication carrier that is employed in the vehicle 2. In OP104, the control unit 41 executes the acquisition process for the first route for downloading the update data during traveling. Details of the acquisition process for the first route are shown in the above (1) and (2), and will be described later.

In OP105, the control unit 41 determines whether the download of the update data will be completed in the case of the traveling along the first route acquired in OP104. In the case where the download of the update data will be completed in the case of the traveling along the first route (OP105: YES), the process proceeds to OP106. In OP106, the control unit 41 creates the schedule including the traveling along the first route and the download, and sends the created schedule to the vehicle 2. Further, the control unit 41 registers the created schedule in the schedule information DB 43. Thereafter, the process shown in FIG. 8 ends.

In the case where the download of the update data will not be completed in the case of the traveling along the first route (OP105: NO), the process proceeds to OP107. In OP107, in an hour period when the vehicle 2 is in the first standby state after the delivery start date and hour, the control unit 41 creates the schedule for the download of the update data and the update, and sends the created schedule to the vehicle 2. Further, the control unit 41 registers the created schedule in the schedule information DB 43. Thereafter, the process shown in FIG. 8 ends.

The process shown in FIG. 8 is an example, and the creation process for the update schedule due to the receiving of the release note is not limited to the process shown in FIG. 8. For example, in FIG. 8, in the case where it is determined that the download for the update data will not be completed during traveling along the acquired first route, the schedule for the traveling along the first route is not created. Instead, the schedule for downloading the update data during traveling along the first route may be created regardless of whether the download of the update data will be completed.

Figure 9:
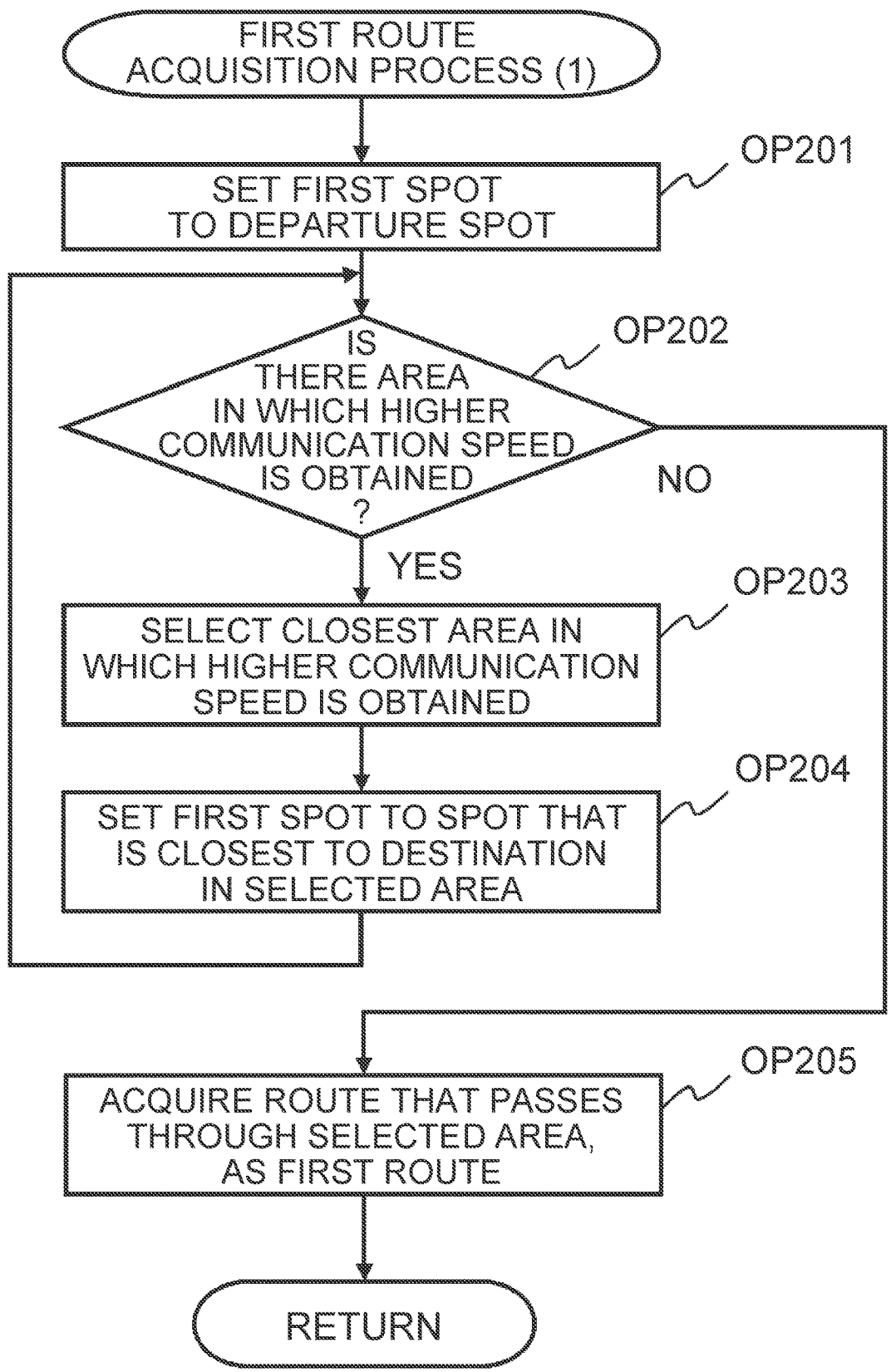
FIG. 9 shows an example of a flowchart of an acquisition process for a first route.

FIG. 9 shows an example of a flowchart of an acquisition process for the first route. The acquisition process for the first route is a process that is executed in OP104 in FIG. 8. The process shown in FIG. 9 is a process relevant to the acquisition method for the first route in the above (1).

In OP201, the control unit 41 sets the departure spot as the initial value of a first spot. The departure spot is the predicted traveling position on the delivery start date and hour. In OP202, the control unit 41 determines whether there is an area in which a higher communication speed is obtained than in peripheral areas, between the first spot and the destination. In the case where there is an area in which a higher communication speed is obtained than in peripheral areas, between the first spot and the destination (OP202: YES), the process proceeds to OP203. In the case where there is no area in which a higher communication speed is obtained than in peripheral areas, between the first spot and the destination (OP202: NO), the process proceeds to OP205.

In OP203, the control unit 41 selects an area that is closest to the destination side from the first spot and in which a higher communication speed is obtained than in peripheral areas, on the communication speed map. In OP204, the control unit 41 sets the first spot to a spot that is closest to the destination in the area selected in OP203. Thereafter, the process proceeds to OP202.

In OP205, the control unit 41 acquires, as the first route, a route that passes from the departure spot to the destination through the selected area. In the case where the area is not selected (for example, in the case where there is no area in which a higher communication speed is obtained than in the periphery, between the departure spot and the destination), the control unit 41 evaluates and acquires the route from the departure spot to the destination as the first route in a normal way. Thereafter, the process proceeds to OP105 in FIG. 8.

Figure 10:
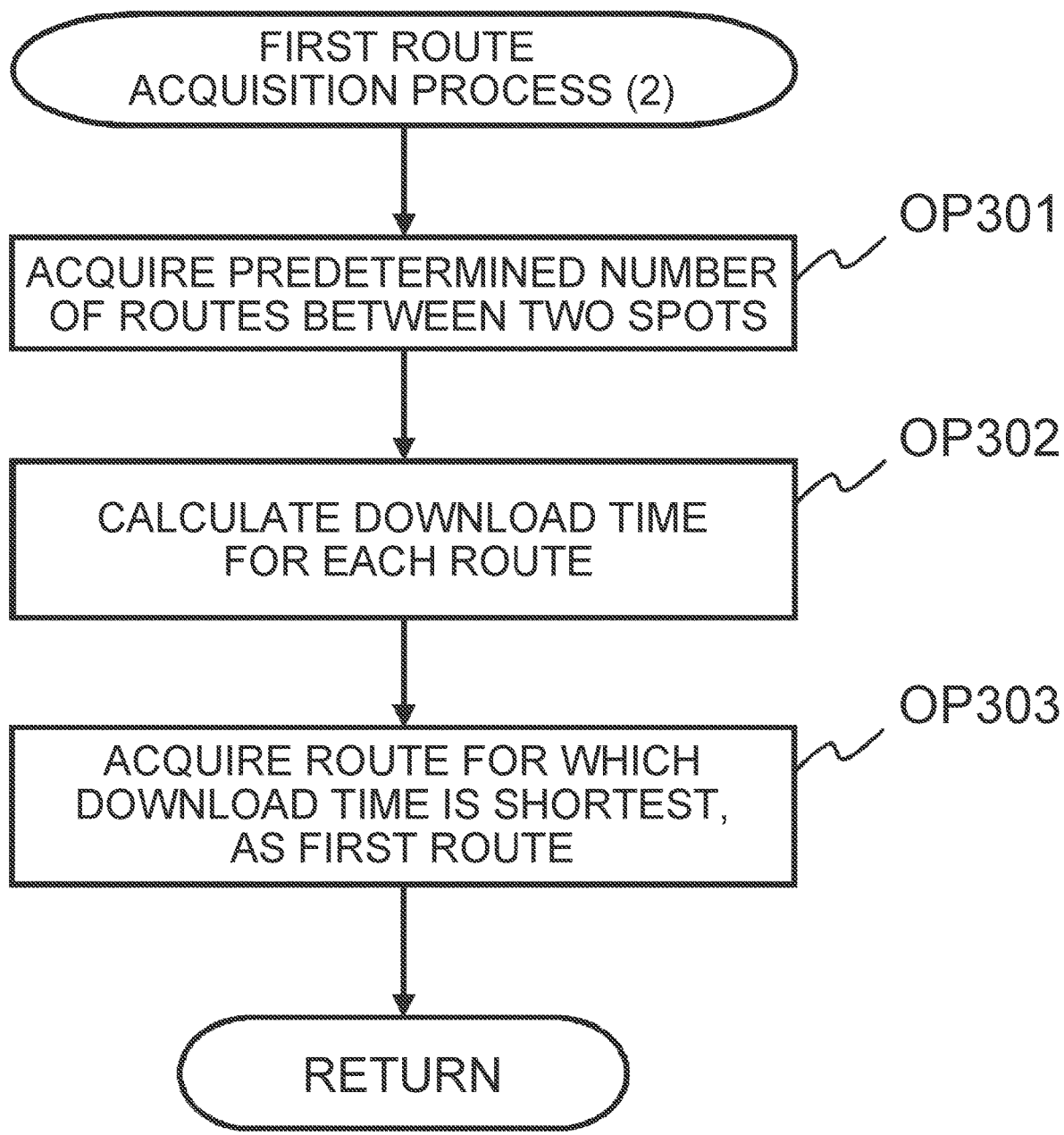
FIG. 10 shows an example of a flowchart of an acquisition process for the first route.

FIG. 10 is an example of a flowchart of an acquisition process for the first route. The acquisition process for the first route is a process that is executed in OP104 in FIG. 8. The process shown in FIG. 10 is a process relevant to the acquisition method for the first route in the above (2).

In OP301, the control unit 41 acquires a predetermined number of routes between the two spots that are the departure spot and the destination. For example, the route between the two spots is evaluated such that the movement distance or movement time is short. For example, the predetermined number of routes are a predetermined number of routes in an order from a route for which the movement distance or movement time is shortest.

In OP302, the control unit 41 calculates the download time for the update data for each of the predetermined number of routes acquired in OP301. Specifically, first, for each route, the control unit 41 acquires sections that are separated by communication speeds obtained in spots. For example, in the case where the route passes through an area A and an area B that are different in communication speed, in an order of area A→area B→area A, the route includes three sections.

Next, the control unit 41 evaluates the traveling time for each section, and evaluates the data size that can be downloaded, from the traveling time and the obtained communication speed. The control unit 41 evaluates the time length spent on the download of the update data in the case of the traveling along the route, from the data size that can be downloaded in each section and the size of the update data.

In OP303, the control unit 41 acquires, as the first route, a route for which the download time for the update data is shortest, from the predetermined number of routes acquired in OP301. Thereafter, the process proceeds to OP105 in FIG. 8.

Case where Plurality of Communication Carriers is Employed in Vehicle 2

For example, in the case where SIM cards for a plurality of communication carriers are inserted into the DCM 21 of the vehicle 2, the vehicle 2 can perform wireless communication using electric waves of the plurality of communication carriers. In this case, when the first route is acquired, what communication carrier is used is considered.

In the case where a plurality of communication carriers is employed in the vehicle 2, the control unit 41 refers to a plurality of communication speed maps at the time of the acquisition of the first route. There is a high possibility that the communication speed that is obtained using a communication carrier A and the communication speed that is obtained using a communication carrier B are different from each other in an identical spot.

Hence, in the above first route acquisition method (1), in the case where a plurality of communication carriers is employed in the vehicle 2, the control unit 41 acquires, as the first route, a route that passes through an area that is between the two spots, that is of a single or a plurality of areas for the communication carriers employed in the vehicle 2 and in which a higher communication speed is obtained. Specifically, for example, in accordance with the flowchart shown in FIG. 9, the control unit 41 may acquire the route by selecting a communication carrier area that is closest to the current position on the destination spot side from the departure spot and in which a higher communication speed is obtained.

Figure 11:
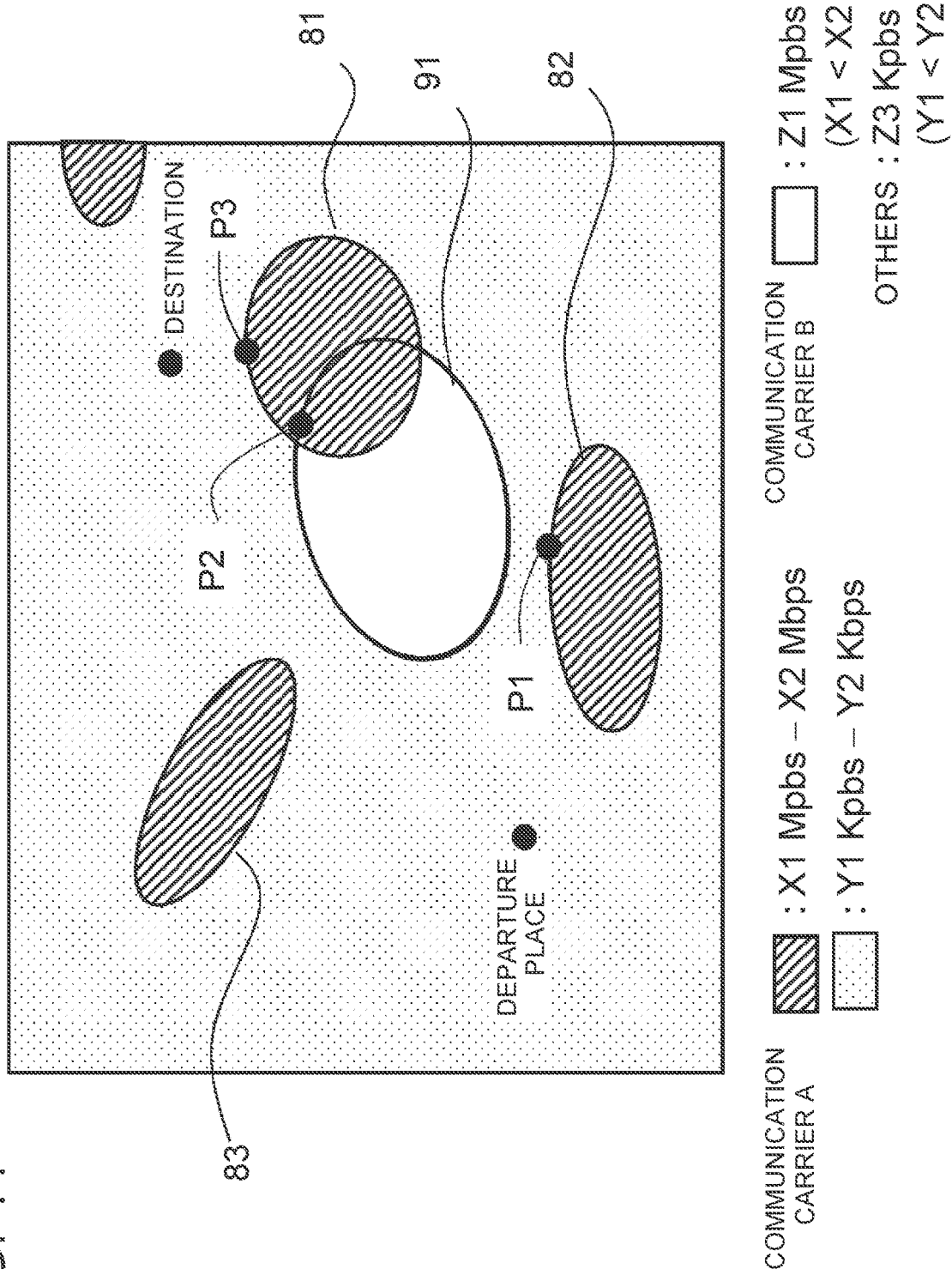
FIG. 11 shows an example of a diagram on which communication speed maps for two communication carriers in an identical range are superposed.

FIG. 11 shows an example of a diagram on which communication speed maps for two communication carriers in an identical range are superposed. In FIG. 11, communication speed maps for two communication carriers of the communication carrier A and the communication carrier B are superposed. The communication speed map for the communication carrier A is divided into areas by a communication speed range of X1 Mbps to X2 Mbps and a communication speed range of Y1 Kbps to Y2 Kbps. The communication speed map for the communication carrier B is divided into areas by a communication speed range of Z1 Mbps to Z2 Mbps (X1<X2<Z1<Z2) and a communication speed range of Z3 Kbps to Z4 Kbps (Y1<Y2<Z3<Z4).

An area 81, an area 82 and an area 83 for the communication carrier A and an area 91 for the communication carrier B exist between the departure spot and the destination, as areas in which the communication speed is higher than in the periphery (OP202: YES in FIG. 9). The control unit 41 selects the area 82 for the communication carrier A that is closest to the departure spot and in which a higher communication speed is obtained (OP203 in FIG. 9).

Next, the area 81 for the communication carrier A and the area 91 for the communication carrier B exist between a spot P1 closest to the destination in the area 82 and the destination (OP202: YES in FIG. 9). The control unit 41 selects the area 91 for the communication carrier B that is closest to the spot P1 and in which a higher communication speed is obtained (OP203 in FIG. 9).

Next, the area 81 for the communication carrier A exists between a spot P2 closest to the destination in the area 91 and the destination (OP202: YES in FIG. 9). The control unit 41 selects the area 81 for the communication carrier A that is closest to the spot P2 and in which a higher communication speed is obtained (OP203 in FIG. 9). There is no area in which the communication speed is higher than in the periphery, between the spot P3 closest to the destination in the area 81 and the destination (OP202: NO in FIG. 9).

Accordingly, the area 81, the area 82 and the area 91 are selected between the departure spot and the destination. As the first route, the control unit 41 acquires the route between the two spots such that the route passes through the area 81, the area 82 and the area 91. At this time, the route may be acquired such that the vehicle 2 goes through the spots P1 to P3.

The first route obtained in this way passes through the area having the communication range of Z3 Kbps to Z4 Kbps for the communication carrier B, the area 82 for the communication carrier A, the area having the communication range of Z3 Kbps to Z4 Kbps for the communication carrier B, the area 91 for the communication carrier B, the area 81 for the communication carrier A and the area having the communication range of Z3 Kbps to Z4 Kbps for the communication carrier B, in order.

In the case where this route is acquired as the first route, the control unit 41 acquires sections obtained by separating the first route by the kind of the communication carrier that provides the highest communication speed. In the example shown in FIG. 11, from the first route acquired described above, the control unit 41 acquires five sections: a section where the first route passes through the area having the communication range of Z3 Kbps to Z4 Kbps for the communication carrier B, a section where the first route passes through the area 82 for the communication carrier A, a section where the first route passes through the area having the communication range of Z3 Kbps to Z4 Kbps for the communication carrier B and the area 91 for the communication carrier B, a section where the first route passes through the area 81 for the communication carrier A, and a section where the first route passes through the area having the communication range of Z3 Kbps to Z4 Kbps for the communication carrier B. A range in which areas overlap between the communication carriers is separated as a section where the first route passes through an area for the communication carrier that provides a higher communication speed. The control unit 41 creates the schedule information including the traveling along the first route, the download of the update data and the use of the corresponding communication carrier in each section on the first route (OP106 in FIG. 8).

Next, in the above first route acquisition method (2), in the case where a plurality of communication carriers is employed in the vehicle 2, the first route is acquired in accordance with the flowchart shown in FIG. 10, for example. For example, the time length spent on the download of the update data for each of a plurality of routes between the two spots is calculated as follows. First, using the communication speed map for each communication carrier employed in the vehicle 2, sections are acquired by separating a single route based on the highest communication speed that is obtained in each spot on the route. That is, sections are acquired based on difference in the highest communication speed. In the example shown in FIG. 11, from a route that passes through the area 91 and the area 81, the control unit 41 acquires four sections: a section where the route passes through the area having the communication range of Z3 Kbps to Z4 Kbps for the communication carrier B, a section where the route passes through the area 91 for the communication carrier B, a section where the route passes through the area 81 for the communication carrier A, and a section where the route passes through the area having the communication range of Z3 Kbps to Z4 Kbps for the communication carrier B. A range in which the area 81 and the area 91 overlap is separated as a section where the route passes through the area 91 for the communication carrier B that provides a higher communication speed. In the case where a plurality of communication carriers provides an identical communication speed in an identical spot, a communication carrier to which a higher priority is previously given is preferentially selected. As the communication speed, the representative value in the range of the communication speed that is obtained in each spot is used.

The control unit calculates the time length of the traveling and the data size that can be downloaded in the case of the use of the communication carrier that provides the highest communication speed, for each section on the route, and calculates the time length spent on the download of the update data in the case of the traveling along the route, in the same way as the above (2). The control unit 41 acquires, as the first route, a route for which the time length is shortest. In this case, the control unit 41 creates the schedule information including the traveling along the first route, the download of the update data and the use of the communication carrier that provides the highest communication speed in each section on the first route (OP106 in FIG. 8).

Function Effect of First Embodiment

With the first embodiment, it is possible to create the schedule such that the vehicle 2 downloads the update data during traveling. In the first embodiment, using the communication speed map, the traveling route is acquired such that a higher communication speed is obtained, and therefore the vehicle 2 can stably perform the communication during traveling.

Second Embodiment

In the first embodiment, the first route for which it is predicted that the time spent on the download of the update data is shortest is acquired based on the communication speed that is obtained in each spot. Instead, in a second embodiment, in the case where a plurality of communication carriers is employed in the vehicle 2, the first route is acquired based on the relation between the communication speed and the number of contract users of the communication carrier. In the second embodiment, the system configuration of the information processing system 100 and the hardware configuration and functional configuration of the control center 4 are the same as those in the first embodiment. Descriptions in common with the first embodiment are omitted in the second embodiment.

As the relation between the communication speed and the number of contract users of the communication carrier, it is empirically known that the communication speed that is actually obtained is higher as a value resulting from dividing the communication speed by the number of contact users of the communication carrier is larger. This may be because there is a possibility that the number of concurrently accessing terminals is larger as the number of contract users of the communication carrier is larger, and the processing load in a base station or the like is higher and the usage rate of a wireless bandwidth increases as the number of concurrently accessing terminals is larger.

That is, for example, there is often a gap between the communication speed published by the communication speed map and the actually obtained communication speed, and a cause of the gap can be the number of contract users of the communication carrier in the region. Accordingly, in the second embodiment, the control unit 41 acquires the first route for which it is predicted that the time spent on the download of the update data is shortest, based on the relation between the communication speed and the number of contract users of the communication carrier.

The representative value in the range of the communication speed that is obtained from the communication speed map is used as the communication speed that is used for the calculation of the first route. For example, the number of contract users of the communication carrier is published by the communication carrier, for each local region, each prefecture or each municipality, and is acquired through the internet. A range in which the number of contract users of the communication carrier is aggregated is an example of the "first range". In the second embodiment, as the acquisition method for the first route, for example, there are two methods described below. Hereinafter, the value resulting from dividing the communication speed by the number of contact users of the communication carrier is referred to as a first value. The first value is evaluated by dividing the communication speed obtained from the communication speed map in a certain spot by the number of contract users of the communication carrier in a range containing the spot. The range containing the spot is a range in which the number of contract users of the communication carrier is aggregated.

(3) In the case where a plurality of communication carriers is employed in the vehicle 2, the control unit 41 acquires, as the first route, a route that passes through an area that is between the two spots, that is of a single or a plurality of areas for the communication carriers employed in the vehicle 2 and in which a larger first value is obtained. Specifically, for example, the control unit 41 acquires the route by selecting a communication carrier area that is closest to the current position on the destination spot side from the departure spot and in which a larger first value is obtained. In this case, the control unit 41 acquires a single or a plurality of sections obtained by separating the first route by the kind of a communication carrier that is of the communication carriers employed in the vehicle 2 and for which the first value is largest. The control unit 41 creates the schedule information including the traveling along the first route, the download of the update data and the use of the corresponding communication carrier in each section on the first route.

(4) In the case where a plurality of communication carriers is employed in the vehicle 2, the control unit 41 acquires, as the first route, a route for which the total value of first values in sections is largest, for each of a plurality of routes between the two spots. First, the control unit 41 acquires the plurality of routes between the two spots, by a predetermined route search method. For example, the control unit 41 acquires a predetermined number of routes in an order from a route for which the movement time or movement distance between the two spots is shortest. For each of the acquired routes, the control unit 41 acquires sections that are separated by the largest first value of the respective first values for the communication carriers employed in the vehicle 2. The first value is evaluated by the communication speed and the number of contract users of the communication carrier, and therefore, when the combination of the communication speed and the communication carrier is different, the section is separated and another section is obtained.

The control unit 41 acquires the total value of the largest first values in the sections, for each route, and acquires, as the first route, a route for which the total value of the first values is largest. In this case, the control unit 41 creates the schedule information including the traveling along the first route, the download of the update data and the use of the communication carrier for which the largest first value is obtained in each section on the first route.

In the second embodiment, similarly to the first embodiment, the creation process for the update schedule due to the receiving of the release note by the control center 4 is executed in accordance with the flowchart in FIG. 8. In OP104 in FIG. 8, in the second embodiment, the above process (3) or (4) is executed, and the first route is acquired.

Figure 12:
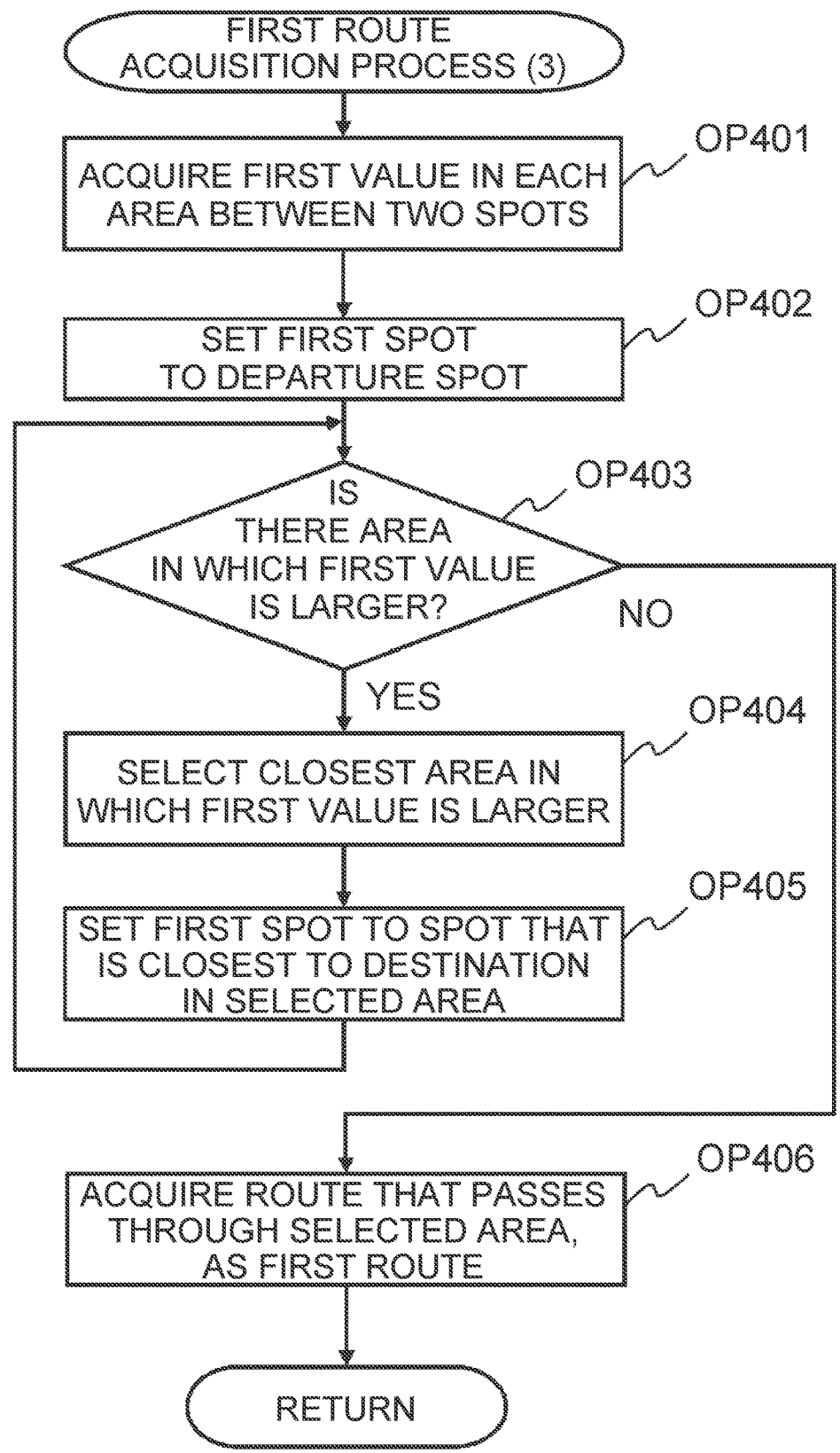
FIG. 12 shows an example of a flowchart of an acquisition process for the first route according to a second embodiment.

FIG. 12 shows an example of a flowchart of an acquisition process for the first route according to the second embodiment. The acquisition process for the first route is a process that is executed in OP104 in FIG. 8. The process shown in FIG. 12 is a process relevant to the acquisition method for the first route in the above (3).

In OP401, the control unit 41 acquires the first value resulting from dividing the communication speed obtained in each area by the number of contract users, on the communication speed map for each communication carrier employed in the vehicle 2. In OP402, the control unit 41 sets the departure spot as the initial value of the first spot. The departure spot is the predicted traveling position on the delivery start date and hour.

In OP403, the control unit 41 determines whether there is an area in which a larger first value is obtained than in peripheral areas, between the first spot and the destination. In the case where there is an area in which a larger first value is obtained than in peripheral areas, between the first spot and the destination (OP403: YES), the process proceeds to OP404. In the case where there is no area in which a larger first value is obtained than in peripheral areas, between the first spot and the destination (OP403: NO), the process proceeds to OP406.

In OP404, the control unit 41 selects an area that is closest to the destination side from the first spot and in which a larger first area is obtained than in peripheral areas, on the communication speed map. In OP405, the control unit 41 sets the first spot to a spot that is closest to the destination in the area selected in OP404. Thereafter, the process proceeds to OP403.

In OP406, the control unit 41 acquires, as the first route, a route that passes from the departure spot to the destination through the selected area. In the case where the area is not selected (for example, in the case where there is no area in which a larger first value is obtained than in the periphery, between the departure spot and the destination), the control unit 41 evaluates and acquires the route from the departure spot to the destination as the first route in a normal way. Thereafter, the process shown in FIG. 12 ends, and the process proceeds to OP105 in FIG. 8. In this case, the control unit 41 creates the schedule information including the traveling along the first route, the download of the update data and the use of the corresponding communication carrier in each section on the first route.

Figure 13:
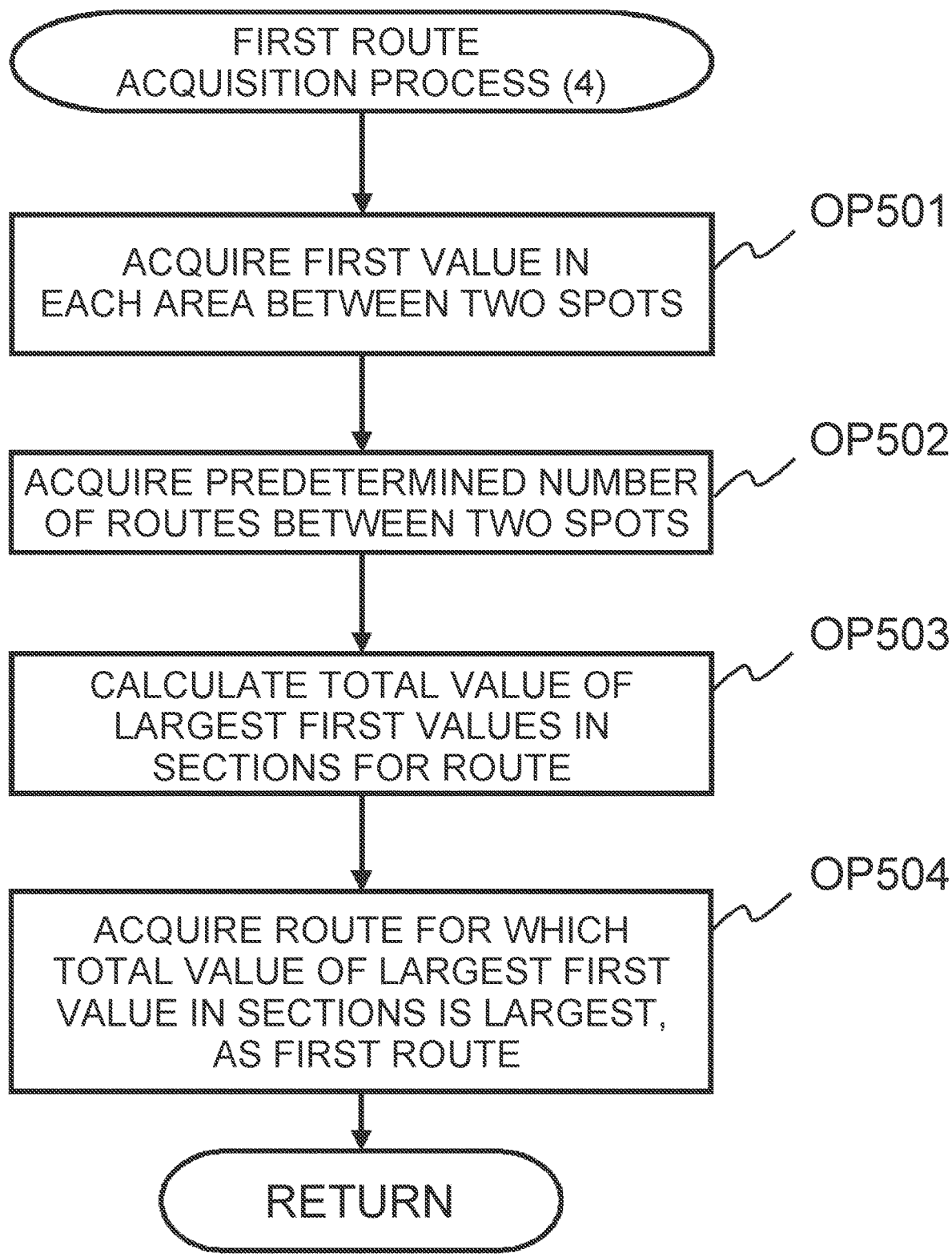
FIG. 13 shows an example of a flowchart of an acquisition process for the first route according to the second embodiment.

FIG. 13 shows an example of a flowchart of an acquisition process for the first route according to the second embodiment. The acquisition process for the first route is a process that is executed in OP104 in FIG. 8. The process shown in FIG. 10 is a process relevant to the acquisition method for the first route in the above (4).

In OP501, the control unit 41 acquires the first value resulting from dividing the communication speed obtained in each area by the number of contract users, on the communication speed map for each communication carrier employed in the vehicle 2. In OP502, the control unit 41 acquires a predetermined number of routes between the two spots that are the departure spot and the destination. For example, the route between the two spots is evaluated such that the movement distance or movement time is short. For example, the predetermined number of routes are a predetermined number of routes in an order from a route for which the movement distance or movement time is shortest.

In OP503, the control unit 41 calculates the total value of first values in sections, for each of the predetermined number of routes acquired in OP502. Specifically, first, for each route, the control unit 41 acquires sections that are separated by the largest first value of the first values for the plurality of communication carriers in each spot. In the example shown in FIG. 11, each area has a different first value, and from a route that passes through the area 91 and the area 81, the control unit 41 acquires four sections: a section where the route passes through the area having the communication range of Z3 Kbps to Z4 Kbps for the communication carrier B, a section where the route passes through the area 91 for the communication carrier B, a section where the route passes through the area 81 for the communication carrier A, and a section where the route passes through the area having the communication range of Z3 Kbps to Z4 Kbps for the communication carrier B. A range in which the area 81 and the area 91 overlap is separated as a section where the route passes through an area in which the first value is larger.

Next, for each section, the control unit 41 acquires the largest first value of the first values obtained for the communication carriers. The control unit 41 evaluates the total value of the largest first values in the sections.

In OP504, the control unit 41 acquires, as the first route, a route for which the total value of the largest first values in the sections is largest, from the predetermined number of routes acquired in OP502. Thereafter, the process shown in FIG. 13 ends, and the process proceeds to OP105 in FIG. 8. In this case, the control unit 41 creates the schedule information including the traveling along the first route, the download of the update data and the use of the communication carrier for which the largest first value is obtained in each section on the first route.

In the second embodiment, the first value resulting from dividing the communication speed by the number of contract users of the communication carrier is used. However, the value that is used as a value expressing the relation between the communication speed and the number of contract users of the communication carrier is not limited to the first value. For example, a value resulting from dividing the number of contract users of the communication carrier by the communication speed may be used. In this case, as a second value resulting from dividing the number of contract users of the communication carrier by the communication speed is smaller, the communication speed that is actually obtained is higher. In the acquisition method for the first route in the above (3), the control unit 41 acquires, as the first route, a route that passes through an area that is between the two spots, that is of a single or a plurality of areas for the communication carriers employed in the vehicle 2 and in which a smaller second value is obtained. In the acquisition method for the first route in the above (4), the control unit 41 acquires, as the first route, a route for which the total value of the second values in the sections is smallest, from the plurality of routes between the two spots. The value indicating the relation between the communication speed and the number of contract users of the communication carrier is not limited to the first value and the second value.

With the second embodiment, it is possible to acquire the first route along which the vehicle 2 travels at the time of the download of the update data, in consideration of the relation between the communication speed and the number of contract users of the communication carrier. Thereby, it is possible to acquire the first route that passes through an area in which the communication speed to be actually obtained is higher, and it is possible to stably perform the download of the update data during traveling along the first route.

Third Embodiment

In a third embodiment, in the case where a plurality of communication carriers is employed in the vehicle 2, the first route is acquired based on the communication speed and the relation between the communication speed and the number of contract users of the communication carrier. Descriptions in common with the first embodiment and the second embodiment are omitted in the third embodiment.

For example, in the acquisition method for the first route in the above (2) in the case where a plurality of communication carriers is employed in the vehicle 2, there is sometimes a plurality of routes, as the route that is of a plurality of routes between the two spots and for which the time length spent on the download of the update data is shortest. In that case, for example, the control unit 41 acquires, as the first route, a route for which the total value of the first values resulting from dividing the communication speed by the number of contract users of the communication carrier in sections is largest. The section in this case is a section that is separated by the highest communication speed that is obtained in each spot on the route.

For example, in the acquisition method for the first route in the above (4) in the case where a plurality of communication carries is employed in the vehicle 2, there is sometimes a plurality of routes, as the route that is of a plurality of routes between the two spots and for which the total value of the first values in the sections is largest. In that case, for example, from the routes, the control unit 41 acquires, as the first route, a route for which the time length spent on the download of the update data is shortest. The section in this case is a section that is separated by the largest first value of the first values of the respective communication carriers employed in the vehicle 2.

With the third embodiment, it is possible to accurately acquire the first route for which it is predicted that the time spent on the download of the update data is shortest.

OTHER MODIFICATIONS

The above embodiments are just examples, and the present disclosure can be carried out while being appropriately modified without departing from the spirit of the present disclosure.

In the first to third embodiments, the control center 4 receives the release note, and creates the schedule for the vehicle 2. However, without being limited to this, the DCM 21 of the vehicle 2 may receive the release note, and may create the schedule for the update. In this case, the control center 4 may receive the release note from the vehicle center 3, and may transfer the release note to the vehicle 2 in the case where the control center 4 determines that the target of the release note is the vehicle 2.

The processes and means described in the present disclosure can be freely combined and carried out, as long as there is no technical inconsistency.

A process described as a process that is performed by a single device may be divided and executed by a plurality of devices. Further, processes described as processes that are performed by different devices may be executed by a single device. In the computer system, the hardware configuration (server configuration) to realize the functions can be flexibly altered.

The present disclosure can be realized also when a computer program including the functions described in the above embodiments is supplied to a computer and one or more processors included in the computer read and execute the program. The computer program may be provided to the computer through a non-transitory computer-readable storage medium that can be connected with a system bus of the computer, or may be provided to the computer through a network. Examples of the non-transitory computer-readable storage medium include an arbitrary type of disk such as a magnetic disk (a floppy (registered trademark) disk, a hard disk drive (HDD) and the like) and an optical disk (a CD-ROM, a DVD disk, a Blu-ray disk and the like), a read only memory (ROM), a random access memory (RAM), an EPROM, an EEPROM, a magnetic card, a flash memory, an optical card, and an arbitrary type of medium suitable for storing electronic commands.

What is claimed is:

1. An information processing device comprising one or more processors configured to:
   acquire a first route of a first vehicle based on a communication speed in an area between a departure point and a destination of the first vehicle, the first vehicle performing a download of first data according to a download plan, wherein the download plan includes a first download plan and a second download plan for executing the download of the first data, and the first data is update data for a first program relevant to an electronic control unit (ECU) that is equipped in the first vehicle;
   acquire information relevant to the first data, the acquired information including at least a delivery start date and hour of the update data,
   in at least one of a case where the ECU is a predetermined ECU or a case where a flag included in information related to the update data indicates a predetermined state, generate the first download plan according to which the first vehicle performs the download of the first data while traveling the first route at an earliest hour after the delivery start date and hour;
   in a case where the ECU is not the predetermined ECU and the flag does not indicate the predetermined state, generate the second download plan according to which the first vehicle performs the download of the first data before or after traveling the first route while being in a standby state;
   transmit the download plan to the first vehicle and control the first vehicle to perform the download of the first data according to the first download plan or the second download plan.

2. The information processing device according to claim 1, wherein the one or more processors are configured to acquire the first route based on a first map indicating a distribution of a communication speed of a first communication carrier that is employed in the first vehicle.

3. The information processing device according to claim 2, wherein the one or more processors are configured to acquire, as the first route, a route where a time spent on the download of the first data is predicted to be shortest.

4. The information processing device according to claim 3, wherein:
   the first map includes a plurality of areas divided based on the communication speed; and the one or more processors are configured to acquire the first route such that the first route passes through an area of which the communication speed is highest from among one or more areas between the departure point and the destination.

5. The information processing device according to claim 4, wherein the one or more processors are configured to, when the first communication carrier includes plural kinds of communication carriers, generate the first plan based on each of the first maps respectively corresponding to the communication carriers.

6. The information processing device according to claim 4, wherein the one or more processors are configured to:
acquire the time to be spent on the download of the first data when the first vehicle travels each of a plurality of routes between the departure point and the destination, based on a data size of the first data and communication speeds of one or more areas through which each of the route passes; and
acquire, as the first route, a route corresponding to which the time to be spent on the download of the first data is the shortest.

7. The information processing device according to claim 6, where the one or more processors are configured to:
when the first communication carrier includes plural kinds of communication carriers, acquire, as the first route, based on the size of the first data and the first map corresponding to each of the communication carriers, a route corresponding to which a first time length is the shortest from among a plurality of routes between the departure point and the destination, the first time length being a time to be spent on the download of the first data when a second communication carrier is used at one or more sections of which a communication speed is the highest of communication speeds obtained in sections on each of the routes between the departure point and the destination, the second communication carrier providing the highest communication speed; and
generate the first plan according to which the first vehicle uses the second communication carrier to perform the download in the one or more sections.

8. The information processing device according to claim 7, wherein the one or more processors are configured to, when a plurality of second routes are present each of which is the route corresponding to which the first time length is the shortest, acquire, as the first route, a second route of which a total value of first values respectively calculated for the one or more sections is largest, each of the first values being a value resulting from dividing the communication speed of the second communication carrier by the number of users of the second communication carrier.

9. The information processing device according to claim 3, wherein the one or more processors are configured to, when the first carrier includes plural kinds of communication carriers, acquire the first route based on a relation between the communication speed and the number of users for each of the communication carriers.

10. The information processing device according to claim 9, wherein:
the first map includes a plurality of areas divided based on the communication speed;
the one or more processors are configured to
acquire the first route by selecting an area of which a first value is largest from among one or more areas between the departure point and the destination, the first value being a value resulting from dividing the communication speed of each communication carrier by the number of users of the communication carrier who are in a first range that includes the departure point and the destination; and
generate the first plan according to which the first vehicle uses a third communication carrier corresponding to which the first value is largest to perform the download of the first data in one or more sections where the largest first value is obtained.

11. The information processing device according to claim 3, wherein:
the first map includes areas divided based on the communication speed;
the first communication carrier includes plural kinds of communication carriers; and
the one or more processors are configured to refer to the first map for each of the communication carriers, and acquire the first route based on the communication speed of each of the communication carriers and a relation between the communication speed and the number of users for each of the communication carriers.

12. An information processing method comprising:
acquiring a first route for a first vehicle based on a communication speed in an area between a departure point and a destination of the first vehicle, the first vehicle performing a download of first data according to a download plan, wherein the download plan includes a first download plan and a second download plan for executing the download of the first data, and the first data is update data for a first program relevant to an electronic control unit (ECU) that is equipped in the first vehicle;
acquiring information relevant to the first data, the acquired information including at least a delivery start date and hour of the update data,
in at least one of a case where the ECU is a predetermined ECU or a case where a flag included in information related to the update data indicates a predetermined state, generating the first download plan according to which the first vehicle performs the download of the first data while traveling the first route at an earliest hour after the delivery start date and hour;
in a case where the ECU is not the predetermined ECU and the flag does not indicate the predetermined state, generating the second download plan according to which the first vehicle performs the download of the first data while being in a standby state before or after traveling the first route; and
transmitting the download plan to the first vehicle and control the first vehicle to perform the download of the first data according to the first download plan or the second download plan.

13. An information processing system comprising:
a first vehicle; and
an information processing device including one or more processors configured to:
acquire a first route for the first vehicle based on a communication speed in an area between a departure point and a destination of the first vehicle, the first vehicle performing a download of first data according to a download plan, wherein the download plan includes a first download plan and a second download plan for executing the download of the first data, and the first data is update data for a first program relevant to an electronic control unit (ECU) that is equipped in the first vehicle;

acquire information relevant to the first data, the acquired information including at least a delivery start date and hour of the update data, in at least one of a case where the ECU is a predetermined ECU or a case where a flag included in information related to the update data indicates a predetermined state, generate the first download plan according to which the first vehicle performs the download of the first data while traveling the first route at an earliest hour after the delivery start date and hour;

in a case where the ECU is not the predetermined ECU and the flag does not indicate the predetermined state, generate the second download plan according to which the first vehicle performs the download of the first data while being in a standby state before or after traveling the first route; and transmit the download plan to the first vehicle and control the first vehicle to perform the download of the first data according to the first download plan or the second download plan.

* * * * *